United States Patent
Chaudhri et al.

(10) Patent No.: US 10,055,121 B2
(45) Date of Patent: Aug. 21, 2018

(54) ACTIVITY BASED THRESHOLDS AND FEEDBACKS

(71) Applicant: Apple Inc., Cupertino, CA (US)

(72) Inventors: Imran Chaudhri, San Francisco, CA (US); Nicholas Zambetti, San Francisco, CA (US); Stephen O. LeMay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/841,402

(22) Filed: Aug. 31, 2015

(65) Prior Publication Data

US 2016/0259542 A1 Sep. 8, 2016

Related U.S. Application Data

(60) Provisional application No. 62/129,823, filed on Mar. 7, 2015.

(51) Int. Cl.
*G06F 3/0488* (2013.01)
*G06F 3/0346* (2013.01)
(Continued)

(52) U.S. Cl.
CPC .......... *G06F 3/04883* (2013.01); *G06F 3/015* (2013.01); *G06F 3/016* (2013.01);
(Continued)

(58) Field of Classification Search
CPC ..... G06F 2203/014; G06F 3/015; G06F 3/016
See application file for complete search history.

(56) References Cited

U.S. PATENT DOCUMENTS

| 5,208,790 A | 5/1993 | Sato |
| 5,455,808 A | 10/1995 | Grupp et al. |

(Continued)

FOREIGN PATENT DOCUMENTS

| AU | 2010249319 A1 | 6/2012 |
| AU | 2015101019 A4 | 9/2015 |

(Continued)

OTHER PUBLICATIONS

Final Office Action received for U.S. Appl. No. 14/503,072, dated Sep. 1, 2015, 16 pages.

(Continued)

*Primary Examiner* — Chun-Nan Lin
(74) *Attorney, Agent, or Firm* — Dentons US LLP

(57) ABSTRACT

The present disclosure relates to varying threshold and feedback based on activity. The present disclosure includes receiving an input having an input intensity. Further, in response to receiving the input and in accordance with a determination that an electronic device is in a second activity state different from a first activity state, determining whether the input intensity of the input meets or exceeds a second characteristic intensity threshold different from a first characteristic intensity threshold. Additionally, in accordance with a determination that the input intensity of the input meets or exceeds the second characteristic intensity threshold, performing the application process and/or providing a haptic feedback of a second feedback level different from a first feedback level.

27 Claims, 28 Drawing Sheets

(51) Int. Cl.
*G06F 3/01* (2006.01)
*G06F 3/0338* (2013.01)
(52) U.S. Cl.
CPC .......... *G06F 3/0338* (2013.01); *G06F 3/0346* (2013.01); *G06F 3/0488* (2013.01); *G06F 2203/014* (2013.01)

(56) References Cited

U.S. PATENT DOCUMENTS

| | | |
|---|---|---|
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai |
| 5,986,655 A | 11/1999 | Chiu et al. |
| 5,999,195 A | 12/1999 | Santangeli |
| 6,266,098 B1 | 7/2001 | Cove et al. |
| 6,279,018 B1 | 8/2001 | Kudrolli et al. |
| 6,323,846 B1 | 11/2001 | Westerman et al. |
| 6,359,839 B1 | 3/2002 | Schenk et al. |
| 6,441,824 B2 | 8/2002 | Hertzfeld |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,556,222 B1 | 4/2003 | Narayanaswami |
| 6,570,557 B1 | 5/2003 | Westerman et al. |
| 6,661,438 B1 | 12/2003 | Shiraishi et al. |
| 6,662,023 B1 | 12/2003 | Helle |
| 6,677,932 B1 | 1/2004 | Westerman |
| 6,728,533 B2 | 4/2004 | Ishii |
| 6,809,724 B1 | 10/2004 | Shiraishi et al. |
| 6,871,076 B2 | 3/2005 | Samn |
| 7,081,905 B1 | 7/2006 | Raghunath |
| 7,130,664 B1 | 10/2006 | Williams |
| 7,257,254 B2 | 8/2007 | Tunney |
| 7,479,949 B2 | 1/2009 | Jobs et al. |
| 7,515,509 B2 | 4/2009 | Klein |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,751,285 B1 | 7/2010 | Cain |
| 7,843,769 B2 | 11/2010 | Ishida et al. |
| 7,844,914 B2 | 11/2010 | Andre et al. |
| 7,898,542 B1 | 3/2011 | Yu et al. |
| 7,957,762 B2 | 6/2011 | Herz et al. |
| 8,006,002 B2 | 8/2011 | Kalayjian et al. |
| 8,050,997 B1 | 11/2011 | Nosek et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,462,997 B2 | 6/2013 | Pettit et al. |
| 8,479,122 B2 | 7/2013 | Hotelling et al. |
| 8,543,081 B2 | 9/2013 | Scott et al. |
| 8,584,031 B2 | 11/2013 | Moore et al. |
| 8,595,649 B2 | 11/2013 | Sherrard et al. |
| 8,613,070 B1 | 12/2013 | Borzycki et al. |
| 8,666,361 B2 | 3/2014 | Chu et al. |
| 8,675,084 B2 | 3/2014 | Bolton et al. |
| 8,732,609 B1 | 5/2014 | Bayersdorfer et al. |
| 8,884,874 B1 | 11/2014 | Kim et al. |
| 8,963,894 B2 | 2/2015 | Klassen et al. |
| 8,996,639 B1 | 3/2015 | Faaborg et al. |
| 9,070,092 B2 | 6/2015 | Chou et al. |
| 9,173,052 B2 | 10/2015 | Hauser et al. |
| 9,244,562 B1* | 1/2016 | Rosenberg .......... G06F 3/04847 |
| 9,459,781 B2 | 10/2016 | Wilson et al. |
| 9,547,425 B2 | 1/2017 | Wilson et al. |
| 2002/0015024 A1 | 2/2002 | Westerman et al. |
| 2002/0054066 A1 | 5/2002 | Kikinis et al. |
| 2002/0054541 A1 | 5/2002 | Hall |
| 2002/0131331 A1 | 9/2002 | Molander |
| 2003/0002391 A1 | 1/2003 | Biggs |
| 2003/0067497 A1 | 4/2003 | Pichon |
| 2003/0074647 A1 | 4/2003 | Andrew |
| 2003/0164847 A1 | 9/2003 | Zaima et al. |
| 2003/0214885 A1 | 11/2003 | Powell et al. |
| 2004/0001105 A1 | 1/2004 | Chew et al. |
| 2004/0021699 A1 | 2/2004 | Fildebrandt |
| 2004/0168107 A1 | 8/2004 | Sharp et al. |
| 2004/0218472 A1 | 11/2004 | Narayanaswami et al. |
| 2005/0041667 A1 | 2/2005 | Miller et al. |
| 2005/0094492 A1 | 5/2005 | Rosevear |
| 2005/0125744 A1 | 6/2005 | Hubbard et al. |
| 2005/0187873 A1 | 8/2005 | Labrou et al. |
| 2005/0191159 A1 | 9/2005 | Benko |
| 2005/0200611 A1 | 9/2005 | Goto et al. |
| 2005/0278757 A1 | 12/2005 | Grossman et al. |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0035628 A1 | 2/2006 | Miller et al. |
| 2006/0035632 A1 | 2/2006 | Sorvari et al. |
| 2006/0085765 A1 | 4/2006 | Peterson et al. |
| 2006/0197753 A1 | 9/2006 | Hotelling |
| 2006/0214935 A1 | 9/2006 | Boyd et al. |
| 2006/0294025 A1 | 12/2006 | Mengerink |
| 2007/0006096 A1 | 1/2007 | Kim et al. |
| 2007/0082707 A1 | 4/2007 | Flynt et al. |
| 2007/0094330 A1 | 4/2007 | Russell |
| 2007/0101279 A1 | 5/2007 | Chaudhri et al. |
| 2007/0135043 A1 | 6/2007 | Hayes et al. |
| 2007/0162872 A1 | 7/2007 | Hong et al. |
| 2007/0239754 A1 | 10/2007 | Schnitman |
| 2007/0279190 A1 | 12/2007 | Lugt et al. |
| 2008/0046839 A1 | 2/2008 | Mehra et al. |
| 2008/0082930 A1 | 4/2008 | Omernick et al. |
| 2008/0155428 A1 | 6/2008 | Lee |
| 2008/0168396 A1 | 7/2008 | Mates et al. |
| 2008/0192021 A1 | 8/2008 | Lim et al. |
| 2008/0215240 A1 | 9/2008 | Howard et al. |
| 2008/0320391 A1 | 12/2008 | Lemay et al. |
| 2009/0036165 A1 | 2/2009 | Brede |
| 2009/0100342 A1 | 4/2009 | Jakobson |
| 2009/0164923 A1 | 6/2009 | Ovi |
| 2009/0178007 A1 | 7/2009 | Matas et al. |
| 2009/0199130 A1 | 8/2009 | Tsern et al. |
| 2009/0205041 A1 | 8/2009 | Michalske |
| 2009/0231356 A1 | 9/2009 | Barnes et al. |
| 2009/0244015 A1 | 10/2009 | Sengupta et al. |
| 2009/0254624 A1 | 10/2009 | Baudin et al. |
| 2009/0287470 A1 | 11/2009 | Farnsworth et al. |
| 2009/0300146 A1 | 12/2009 | Park et al. |
| 2009/0305732 A1 | 12/2009 | Marcellino et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0064255 A1 | 3/2010 | Rottler et al. |
| 2010/0082481 A1 | 4/2010 | Lin et al. |
| 2010/0110082 A1 | 5/2010 | Myrick et al. |
| 2010/0123724 A1 | 5/2010 | Moore et al. |
| 2010/0141606 A1* | 6/2010 | Bae .................. G06F 3/016 345/174 |
| 2010/0156833 A1 | 6/2010 | Kim et al. |
| 2010/0157742 A1 | 6/2010 | Relyea et al. |
| 2010/0217657 A1 | 8/2010 | Gazdzinski |
| 2010/0223145 A1 | 9/2010 | Dragt |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0251176 A1 | 9/2010 | Fong et al. |
| 2010/0267362 A1 | 10/2010 | Smith et al. |
| 2010/0281374 A1 | 11/2010 | Schulz et al. |
| 2011/0016425 A1 | 1/2011 | Homburg et al. |
| 2011/0018695 A1* | 1/2011 | Bells .................. G06F 3/016 340/407.2 |
| 2011/0022472 A1 | 1/2011 | Zon et al. |
| 2011/0025719 A1 | 2/2011 | Yanase |
| 2011/0029870 A1 | 2/2011 | May et al. |
| 2011/0078624 A1 | 3/2011 | Missig et al. |
| 2011/0083111 A1 | 4/2011 | Forutanpour et al. |
| 2011/0088086 A1 | 4/2011 | Swink et al. |

(56) References Cited

U.S. PATENT DOCUMENTS

| | | |
|---|---|---|
| 2011/0138329 A1 | 6/2011 | Wells et al. |
| 2011/0151415 A1 | 6/2011 | Darling |
| 2011/0179372 A1 | 7/2011 | Moore et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0251892 A1 | 10/2011 | Laracey et al. |
| 2011/0265002 A1 | 10/2011 | Hong et al. |
| 2011/0296324 A1 | 12/2011 | Goossens et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0026110 A1 | 2/2012 | Yamano |
| 2012/0028707 A1 | 2/2012 | Raitt et al. |
| 2012/0059787 A1 | 3/2012 | Brown et al. |
| 2012/0084729 A1 | 4/2012 | Lin |
| 2012/0089507 A1 | 4/2012 | Zhang et al. |
| 2012/0092383 A1 | 4/2012 | Hysek et al. |
| 2012/0110438 A1 | 5/2012 | Peraza et al. |
| 2012/0117507 A1 | 5/2012 | Tseng et al. |
| 2012/0124499 A1 | 5/2012 | Tsai |
| 2012/0154293 A1 | 6/2012 | Hinckley et al. |
| 2012/0159380 A1 | 6/2012 | Kocienda et al. |
| 2012/0167008 A1 | 6/2012 | Zaman et al. |
| 2012/0197743 A1 | 8/2012 | Grigg et al. |
| 2012/0223935 A1 | 9/2012 | Renwick |
| 2012/0243735 A1 | 9/2012 | Wu |
| 2012/0254804 A1 | 10/2012 | Sheha et al. |
| 2012/0258684 A1 | 10/2012 | Franz et al. |
| 2012/0290449 A1 | 11/2012 | Mullen et al. |
| 2012/0304084 A1 | 11/2012 | Kim et al. |
| 2012/0310760 A1 | 12/2012 | Phillips et al. |
| 2012/0322370 A1 | 12/2012 | Lee |
| 2012/0322371 A1 | 12/2012 | Lee |
| 2012/0324390 A1 | 12/2012 | Tao |
| 2013/0014019 A1 | 1/2013 | Kim et al. |
| 2013/0024781 A1 | 1/2013 | Douillet et al. |
| 2013/0024802 A1 | 1/2013 | Zeng |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063364 A1 | 3/2013 | Moore |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0085931 A1 | 4/2013 | Runyan |
| 2013/0097566 A1 | 4/2013 | Berglund |
| 2013/0103519 A1 | 4/2013 | Kountotsis et al. |
| 2013/0107674 A1 | 5/2013 | Gossweiler, III et al. |
| 2013/0110719 A1 | 5/2013 | Carter et al. |
| 2013/0116967 A1 | 5/2013 | Akcasu et al. |
| 2013/0117383 A1 | 5/2013 | Hymel |
| 2013/0141365 A1 | 6/2013 | Lynn et al. |
| 2013/0141371 A1 | 6/2013 | Hallford et al. |
| 2013/0143512 A1 | 6/2013 | Hernandez et al. |
| 2013/0169870 A1 | 7/2013 | Lee et al. |
| 2013/0191785 A1 | 7/2013 | Rampson et al. |
| 2013/0205194 A1 | 8/2013 | Decker et al. |
| 2013/0215044 A1 | 8/2013 | Ahn et al. |
| 2013/0225118 A1 | 8/2013 | Jang et al. |
| 2013/0234929 A1 | 9/2013 | Libin |
| 2013/0234969 A1 | 9/2013 | Yeh et al. |
| 2013/0244615 A1 | 9/2013 | Miller et al. |
| 2013/0254705 A1 | 9/2013 | Mooring et al. |
| 2013/0263043 A1 | 10/2013 | Sarbin |
| 2013/0275875 A1 | 10/2013 | Gruber et al. |
| 2013/0295872 A1 | 11/2013 | Guday et al. |
| 2013/0304651 A1 | 11/2013 | Smith et al. |
| 2013/0326418 A1 | 12/2013 | Utsuki et al. |
| 2013/0332358 A1 | 12/2013 | Zhao |
| 2013/0332364 A1 | 12/2013 | Templeton et al. |
| 2014/0013414 A1 | 1/2014 | Bruck |
| 2014/0022183 A1 | 1/2014 | Ayoub et al. |
| 2014/0028735 A1 | 1/2014 | Williams et al. |
| 2014/0055495 A1 | 2/2014 | Kim et al. |
| 2014/0058935 A1 | 2/2014 | Mijares |
| 2014/0059493 A1 | 2/2014 | Kim |
| 2014/0068751 A1 | 3/2014 | Last et al. |
| 2014/0074570 A1 | 3/2014 | Hope et al. |
| 2014/0074716 A1 | 3/2014 | Ni |
| 2014/0082533 A1 | 3/2014 | Kelley |
| 2014/0101056 A1 | 4/2014 | Wendling |
| 2014/0122331 A1 | 5/2014 | Vaish et al. |
| 2014/0126336 A1 | 5/2014 | Goeller et al. |
| 2014/0129441 A1 | 5/2014 | Blanco et al. |
| 2014/0129959 A1 | 5/2014 | Battles et al. |
| 2014/0143145 A1 | 5/2014 | Kortina et al. |
| 2014/0143678 A1 | 5/2014 | Mistry et al. |
| 2014/0143682 A1 | 5/2014 | Druck |
| 2014/0143737 A1 | 5/2014 | Mistry et al. |
| 2014/0149878 A1 | 5/2014 | Mischari et al. |
| 2014/0155031 A1 | 6/2014 | Lee et al. |
| 2014/0157321 A1 | 6/2014 | Kurita |
| 2014/0164955 A1 | 6/2014 | Thiruvidam et al. |
| 2014/0173439 A1 | 6/2014 | Gutierrez et al. |
| 2014/0181219 A1 | 6/2014 | Wang et al. |
| 2014/0189577 A1 | 6/2014 | Shuttleworth et al. |
| 2014/0189584 A1 | 7/2014 | Weng et al. |
| 2014/0195972 A1 | 7/2014 | Lee et al. |
| 2014/0229752 A1 | 8/2014 | Lee |
| 2014/0244165 A1 | 8/2014 | Bells |
| 2014/0245177 A1 | 8/2014 | Maklouf |
| 2014/0250374 A1 | 9/2014 | Ohki et al. |
| 2014/0258935 A1 | 9/2014 | Nishida et al. |
| 2014/0267303 A1 | 9/2014 | Larkin et al. |
| 2014/0279442 A1 | 9/2014 | Luoma et al. |
| 2014/0279556 A1 | 9/2014 | Priebatsch et al. |
| 2014/0282103 A1 | 9/2014 | Crandall |
| 2014/0282254 A1 | 9/2014 | Feiereisen et al. |
| 2014/0289660 A1 | 9/2014 | Min |
| 2014/0304664 A1 | 10/2014 | Lee et al. |
| 2014/0310618 A1 | 10/2014 | Venkatesh |
| 2014/0325408 A1 | 10/2014 | Leppanen et al. |
| 2014/0337791 A1 | 11/2014 | Agnetta et al. |
| 2014/0347289 A1 | 11/2014 | Suh et al. |
| 2014/0380229 A1 | 12/2014 | Volodin et al. |
| 2015/0022438 A1 | 1/2015 | Hong |
| 2015/0100537 A1 | 4/2015 | Grieves et al. |
| 2015/0100621 A1 | 4/2015 | Pan |
| 2015/0106752 A1 | 4/2015 | Yang |
| 2015/0113468 A1 | 4/2015 | Clark |
| 2015/0117162 A1 | 4/2015 | Tsai |
| 2015/0143234 A1 | 5/2015 | Norris, III |
| 2015/0160806 A1 | 6/2015 | Fey et al. |
| 2015/0185703 A1 | 7/2015 | Tanaka |
| 2015/0195179 A1 | 7/2015 | Skare et al. |
| 2015/0301608 A1 | 10/2015 | Nagaraju et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0048283 A1 | 2/2016 | Yang et al. |
| 2016/0062589 A1 | 3/2016 | Wan et al. |
| 2016/0117147 A1 | 4/2016 | Zambetti et al. |
| 2016/0193502 A1* | 7/2016 | Kim .................. A63B 24/0062 715/728 |
| 2016/0261675 A1 | 9/2016 | Block et al. |
| 2016/0358311 A1 | 12/2016 | Chen et al. |
| 2017/0010677 A1* | 1/2017 | Roh ..................... G06F 3/0488 |
| 2017/0068407 A1 | 3/2017 | Wilson et al. |
| 2017/0068439 A1 | 3/2017 | Mohseni |
| 2017/0123640 A1 | 5/2017 | Wilson et al. |
| 2017/0134321 A1 | 5/2017 | Ushio et al. |

FOREIGN PATENT DOCUMENTS

| | | |
|---|---|---|
| CA | 2781636 A1 | 7/2010 |
| CA | 2792987 A1 | 10/2011 |
| CH | 707412 A2 | 6/2014 |
| CN | 1536511 A | 10/2004 |
| CN | 101098535 A | 1/2008 |

(56) References Cited

FOREIGN PATENT DOCUMENTS

| | | | |
|---|---|---|---|
| CN | 101382438 A | 3/2009 | |
| CN | 101702112 A | 5/2010 | |
| CN | 102790826 A | 11/2012 | |
| CN | 103562832 A | 2/2014 | |
| CN | 103713843 A | 4/2014 | |
| CN | 103902165 A | 7/2014 | |
| EP | 1052566 A1 | 11/2000 | |
| EP | 1659504 A2 | 5/2006 | |
| EP | 1674889 A1 | 6/2006 | |
| EP | 1674977 A2 | 6/2006 | |
| EP | 1777611 A1 | 4/2007 | |
| EP | 1832969 A2 | 9/2007 | |
| EP | 2040146 A2 | 3/2009 | |
| EP | 2194508 A1 | 6/2010 | |
| EP | 2204702 A1 | 7/2010 | |
| EP | 2302493 A2 | 3/2011 | |
| EP | 2312512 A1 | 4/2011 | |
| EP | 2413577 A2 | 2/2012 | |
| EP | 2423810 A1 | 2/2012 | |
| EP | 2437148 A2 | 4/2012 | |
| EP | 2551784 A1 | 1/2013 | |
| EP | 2602759 A2 | 6/2013 | |
| EP | 2615607 A2 | 7/2013 | |
| EP | 2653961 A1 | 10/2013 | |
| EP | 2677775 A1 | 12/2013 | |
| EP | 2720126 A1 | 4/2014 | |
| EP | 2725537 A1 | 4/2014 | |
| EP | 2733598 A2 | 5/2014 | |
| EP | 2738640 A2 | 6/2014 | |
| EP | 2821912 A1 | 1/2015 | |
| GB | 2370208 A | 6/2002 | |
| GB | 2475669 A | 6/2011 | |
| JP | 55-80084 A | 6/1980 | |
| JP | 8-110955 A | 4/1996 | |
| JP | 2004-519033 A | 6/2004 | |
| JP | 2005-532607 A | 10/2005 | |
| JP | 2008-97202 A | 4/2008 | |
| JP | 2012-123475 A | 6/2012 | |
| JP | 2012-147432 A | 8/2012 | |
| KR | 10-2015-0001287 | * 1/2015 | ......... A63B 24/0062 |
| TW | 498240 B | 8/2002 | |
| TW | 200512616 A | 4/2005 | |
| TW | 200850058 A | 12/2008 | |
| TW | 201232486 A | 8/2012 | |
| TW | M435665 U | 8/2012 | |
| TW | 201419115 A | 5/2014 | |
| WO | 99/66394 A1 | 12/1999 | |
| WO | 99/66395 A2 | 12/1999 | |
| WO | 01/71433 A1 | 9/2001 | |
| WO | 02/054157 A1 | 7/2002 | |
| WO | 2004/056107 A1 | 7/2004 | |
| WO | 2005/109829 A1 | 11/2005 | |
| WO | 2006/037545 A2 | 4/2006 | |
| WO | 2006/112641 A1 | 10/2006 | |
| WO | 2007/018881 A2 | 2/2007 | |
| WO | 2010/017627 A1 | 2/2010 | |
| WO | 2010/039337 A2 | 4/2010 | |
| WO | 2011/130849 A8 | 5/2012 | |
| WO | 2013/023224 A2 | 2/2013 | |
| WO | 2013/051048 A1 | 4/2013 | |
| WO | 2013/097895 A1 | 7/2013 | |
| WO | 2013/135270 A1 | 9/2013 | |
| WO | 2013/169842 A2 | 11/2013 | |
| WO | 2013/169849 A2 | 11/2013 | |
| WO | 2013/169851 A2 | 11/2013 | |
| WO | 2013/169870 A1 | 11/2013 | |
| WO | 2013/169875 A2 | 11/2013 | |
| WO | 2013/169877 A2 | 11/2013 | |
| WO | 2013/169882 A2 | 11/2013 | |
| WO | 2014/024000 A1 | 2/2014 | |
| WO | 2014/078114 A1 | 5/2014 | |
| WO | 2014/078965 A1 | 5/2014 | |
| WO | 2014/105276 A1 | 7/2014 | |
| WO | 2014/105279 A1 | 7/2014 | |
| WO | 2016/036522 A2 | 3/2016 | |

OTHER PUBLICATIONS

Non Final Office Action received for U.S. Appl. No. 14/503,072, dated Jan. 26, 2015, 12 pages.
Non Final Office Action received for U.S. Appl. No. 14/503,296, dated Jan. 30, 2015, 16 pages.
Non-Final Office Action received for U.S. Appl. No. 14/503,372, dated Dec. 5, 2014, 11 pages.
Non-Final Office Action received for U.S. Appl. No. 14/503,381, dated May 13, 2015, 13 pages.
Non-Final Office Action received for U.S. Appl. No. 14/599,425, dated Mar. 17, 2015, 16 pages.
Office Action received for Australian Patent Application No. 2015100734, dated Jul. 29, 2015, 5 pages.
Kamijo, Noboru, "Next Generation Mobile System—WatchPad1. 5", Available at "http://researcher.ibm.com/researcher/view_group_subpage.php?id=5617", retrieved on Jul. 4, 2015, 2 pages.
LeMay et al., U.S. Appl. No. 60/936,562, filed Jun. 20, 2007, titled "Portable Multifunction Device, Method, and Graphical User Interface for Playing Online Videos", 61 pages.
NDTV, "Sony SmartWatch 2 Launched in India for Rs. 14,990", available at "http://gadgets.ndtv.com/others/news/sony-smartwatch-2-launched-in-india-for-rs-14990-420319", Sep. 18, 2013, 4 pages.
International Search Report and Written Opinion received for PCT Patent Application No. PCT/US2014/053951, dated Dec. 8, 2014, 11 pages.
International Search Report and Written Opinion received for PCT Patent Application No. PCT/US2014/053957, dated Feb. 19, 2015, 11 pages.
International Search Report and Written Opinion received for PCT Patent Application No. PCT/US2014/053958, dated Feb. 19, 2015, 10 pages.
International Search Report and Written Opinion received for PCT Patent Application No. PCT/US2015/019321, dated Jun. 3, 2015, 11 pages.
Apple, "iPhone User's Guide", 2007, 137 pages.
"i Phone User Guide for iOS 7.1 Software", available online at <https://manuals.info.apple.com/MANUALS/1000/MA1681/en_US/iphone_ios7_user_guide.pdf> retrived on Aug. 10, 2015, 162 pages.
Headset Button Controller v7.3 APK Full APP Download for Andriod, Blackberry, iPhone, Jan. 27, 2014, 11 pages.
Colt, Sam, "Here's One Way Apple's Smartwatch Could Be Better Than Anything Else", Business Insider, Aug. 21, 2014, pp. 1-4.
International Search Report and Written Opinion received for PCT Patent Application No. PCT/US2015/019322, dated Jun. 18, 2015, 16 pages.
Final Office Action received for U.S. Appl. No. 14/503,296, dated Jul. 2, 2015, 7 pages.
Yang et al., U.S. Appl. No. 62/006,211, filed Jun. 1, 2014, titled "Displaying Options, Assigning Notification, Ignoring Messages, and Simultaneous User Interface Displays in a Messaging Application", 254 pages.
International Search Report and Written Opinion received for PCT Patent Application No. PCT/US2015/019320, dated Jul. 2, 2015, 14 pages.
International Search Report and Written Opinion received for PCT Patent Application No. PCT/US2015/025188, dated Jun. 23, 2015, 11 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/019317, dated Aug. 25, 2015, 24 pages.

(56) References Cited

OTHER PUBLICATIONS

Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Playmemories Camera Apps, "PlayMemories Camera Apps Help Guide", Available at <https://www.playmemoriescameraapps.com/portal/manual/IS9104-NPIA09014_00-F00002/en/index.html>, 2012, 3 pages.
Techsmith, "Snagit 11—Snagit 11.4 Help", Available at <http://assets.techsmith.com/Downloads/ua-tutorials-snagit-11/Snagit_11.pdf>, Jan. 2014, 146 pages.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Frakes, Dan, "How to Get Started with Airplay", Macworld, May 2013, 8 pages.
Shankland, Stephen, "Chrome OS Gets 'OK Google' Voice Search Control", available online at http://www.cnet.com/news/chrome-os-gets-ok-google-voice-search-control/, May 21, 2014, 4 page.
Non Final Office Action received for U.S. Appl. No. 14/815,890, dated Oct. 19, 2015, 5 pages.
Non Final Office Action received for U.S. Appl. No. 14/815,898, dated Dec. 1, 2015, 22 pages.
Non Final Office Action received for U.S. Appl. No. 14/815,907, dated Jan. 12, 2016, 22 pages.
Non Final Office Action received for U.S. Appl. No. 14/815,909, dated Nov. 27, 2015, 12 pages.
Office Action received for Australian Patent Application No. 2015101019, dated Oct. 14, 2015, 3 pages.
Office Action received for Australian Patent Application No. 2015101020, dated Oct. 26, 2015, 8 pages.
Office Action received for Australian Patent Application No. 2015101183, dated Nov. 6, 2015, 4 pages.
Office Action received for Chinese Patent Application No. 201520595384.6, dated Dec. 9, 2015, 4 pages (2 pages of English Translation and 2 pages of Official Copy).
Office Action received for Chinese Patent Application No. 201520595385.0, dated Dec. 9, 2015, 4 pages (2 pages of English Translation and 2 pages of Official Copy).
Office Action received for Chinese Patent Application No. 201520595408.8, dated Dec. 9, 2015, 4 pages (2 pages of English Translation and 2 pages of Official Copy).
Office Action received for Chinese Patent Application No. 201520595538.1, dated Dec. 9, 2015, 4 pages (2 pages of English Translation and 2 pages of Official Copy).
Office Action received for Chinese Patent Application No. 2015206791980, dated Nov. 18, 2015, 4 pages (2 pages English Translation and 2 pages Official copy).
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for Danish Patent Application No. PA201570499, dated Nov. 3, 2015, 7 pages.
Office Action received for Danish Patent Application No. PA201570498, dated Oct. 30, 2015, 7 pages.
International Search Report and Written Opinion received for PCT Patent Application No. PCT/US2015/034604, dated Nov. 9, 2015, 30 pages.
Invitation to Pay Additional Fees and Partial International Search Report received for PCT Patent Application No. PCT/US2015/034604, dated Sep. 4, 2015, 6 pages.
International Search Report and Written Opinion received for PCT Patent Application No. PCT/US2015/034606, dated Dec. 2, 2015, 17 pages.
Invitation to Pay Additional Fees and Partial International Search Report received for PCT Patent Application No. PCT/US2015/034606, dated Sep. 9, 2015, 6 pages.

Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/046262, dated Nov. 23, 2015, 7 pages.
International Search Report and Written Opinion received for PCT Patent Application No. PCT/US2015/044517, dated Oct. 28, 2015, 13 pages.
APK ROOT, "Butterfly 3D Live Wallpaper 1.0 APK", available at <http://apk-root.blogspot.in/2015/09/download-butterfly-3d-live-wallpaper-10.html/>, Feb. 26, 2013, 7 pages.
Avdonin, Nikita, "Astroviewer 3D", available at <https://www.youtube.comjwatch?v=zY0tslx3JHY/>, Nov. 5, 2013, 2 pages.
Evgenyevich, Sergey, "Earth & Moon in HD Gyro 3D", available at <https://www.youtube.com/watch?v=IRwNcaSYrIs/>, Dec. 1, 2013, 4 pages.
Airshow, "Airshow App for Mobile Devices", available at <http://www.livingearthapp.com/>, 2012, 4 pages.
"Living Earth", available at: http;//www.livingcarthapp.com/, 2014, 6 pages.
"Link to Wayback Machine with link to Google Play showing different layouts of complications associated with a clock face", retrieved from <https://play.google.com/store/apps/details?id=com.levelup.beautifulwidgets.free&hl=da > Sep. 9, 2013, 6 pages.
"Sun Set Solar Image Clock" available at <https://web.archive.orgjweb/20140719005410/http://www.sunsetclock.com/>, 2013, 5 pages.
Viticci, Frederico, "Checking Time Zones with Living Earth", MacStories, available at <https://www.macstories.net/reviews/checking-time-zones-with-living-earth/>, Dec. 11, 2013, 5 pages.
Uikit User Interface Catalog, "Page Controls", available online at <0140703123442/https:/ldeveloper.apple.com/library/ios/documentation/userexperience/ conceptual/UIKitUI Cat . . . >, Dec. 16, 2013, 4 pages.
Non Final Office Action received for U.S. Appl. No. 14/822,769, dated Feb. 5, 2016, 14 pages.
Office Action received for Chinese Patent Application No. 201520594249.X, dated Dec. 9, 2015, 4 pages (2 pages of English Translation and 2 pages of Official Copy).
Intention to Grant received for Danish Patent Application No. PA201570496, dated Feb. 17, 2016, 6 pages.
International Search Report and Written Opinion received for PCT Patent Application No. PCT/US2015/034607, dated Dec. 1, 2015, 23 pages.
Restriction Requirement received for U.S. Appl. No. 14/815,890, dated Feb. 22, 2016, 5 pages.
Office Action received for Australian Patent Application No. 2015101019, dated Feb. 12, 2016, 4 pages.
Office Action received for Denmark Patent Application No. PA201570495, dated Oct. 29, 2015, 7 pages.
Office Action received for Australian Patent Application No. 2015101019, dated Apr. 7, 2016, 4 pages.
Office Action received for Chinese Patent Application No. 2015206791980, dated Mar. 7, 2016, 6 pages (4 pages of English Translation and 2 pages of Official Copy).
Horowitz, Paul, "Always Show Scroll Bars in Mac OS X", OSX Daily, retrieved from the Internet: URL:http:jjosxdaily.com/2011/08/03/show-scroll-bars-mac-os-x-lion/, 2011, 3 pages.
Intention to Grant received for Danish Patent Application No. PA201570563, dated Mar. 17, 2016, 7 pages.
Office Action received for Danish Patent Application No. PA201570667, dated Apr. 1, 2016, 7 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.

(56) References Cited

OTHER PUBLICATIONS

International Search Report and Written Opinion received for PCT Patent Application No. PCT/US2015/046262, dated Mar. 15, 2016, 34 pages.
Invitation to Pay Additional fees received for PCT Patent Application No. PCT/US2015/053353, dated Jan. 21, 2016, 7 pages.
Final Office Action received for U.S. Appl. No. 14/815,879, dated Mar. 24, 2016, 46 pages.
Non Final Office Action received for U.S. Appl. No. 14/815,879, dated Nov. 6, 2015, 35 pages.
Castellini, Rick, "Google Earth", retrieved from https://www.youtube.com/watch?v=bgjMSBXsFZQ, Feb. 12, 2013, 3 pages.
NOVA, "Tour of the Solar System", retrieved from http://www.pbs.org/wgbh/nova/space/tour-solar-system.html, May 24, 2013, 14 pages.
Office Action received for Australian Patent Application No. 2015101021, dated Oct. 28, 2015, 10 pages.
Final Office Action received for U.S. Appl. No. 14/815,898, dated Jun. 9, 2016, 19 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
Notice of Allowance received for Chinese Patent Application No. 201520594249.X, dated Jul. 12, 2016, 4 pages (2 pages of English Translation and 2 pages of Official Copy).
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for U.S. Appl. No. 14/815,907, dated Jul. 28, 2016, 9 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Chinese Patent Application No. 201520679198.0, dated Jun. 24, 2016, 5 pages (3 pages of English Translation and 2 pages of Official Copy).
Office action received for Danish Patent Application No. PA201570495, dated May 4, 2016, 8 pages.
Office Action received for Danish Patent Application No. PA201570497, dated May 17, 2016, 6 pages.
Office Action received for Danish Patent Application No. PA201570498, dated Jun. 2, 2016, 8 pages.
Office Action received for Danish Patent Application No. PA201570499, dated Jun. 16, 2016, 8 pages.
"Pentax K20D Operating Manual", available at: http://www.ricoh-imaging.eu/en/operating-manuals-download.html, 2008, pp. 173-174.
Pre-Interview First Office Action received for U.S. Appl. No. 14/815,890, dated May 26, 2016, 4 pages.
Non Final Office Action received for U.S. Appl. No. 14/833,014, dated Mar. 21, 2016, 26 pages.
ISO 9241-13:1998, "Ergonomic requirements for office work with visual display terminals (VDTs)", Part 13: User guidance, International Standard ISO, vol. 9241-13, Jul. 15, 1998, 40 pages.
Nerdtalk, "The Best Android Clock Widgets", available at: https://www.youtube.com/watch?v=E1bAprWByfU, Apr. 25, 2011, 1 page.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Office Action received for Danish Patent Application No. PA201670319, dated Aug. 2, 2016, 6 pages.

Non-Final Office Action received for U.S. Appl. No. 14/822,769, dated Jun. 29, 2016, 14 pages.
Office Action received for Australian Patent Application No. 2015101021, dated Apr. 26, 2016, 4 pages.
Office Action received for Chinese Patent Application No. 201520595384.6, dated Mar. 25, 2016, 3 pages (1 page of English Translation and 2 pages of Official copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595385.0, dated Mar. 25, 2016, 3 pages (1 page of English Translation and 2 pages of Official copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Advisory Action received for U.S. Appl. No. 14/815,898, dated Aug. 30, 2016, 3 pages.
First Action Interview received for U.S. Appl. No. 14/815,890, dated Aug. 12, 2016, 3 pages.
International Search Report and Written Opinion received for PCT Patent Application No. PCT/US2015/053353, dated May 9, 2016, 21 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/021403, dated May 12, 2016, 23 pages.
Invitation to Pay Additional Fees received for PCT Patent Application No. PCT/US2016/017271, dated May 25, 2016, 7 pages.
Notice of Allowance received for U.S. Appl. No. 14/815,909, dated Sep. 6, 2016, 2 pages.
Office Action received for Australian Patent Application No. 2016100765, dated Aug. 5, 2016, 2 pages.
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Jul. 22, 2016, 3 pages (1 page of English Translation and 2 pages of Official Copy).
Office Action received for Chinese Patent Application No. 201520595408.8, dated Jul. 25, 2016, 3 pages (1 page of English Translation and 2 pages of Official Copy).
Office Action received for Chinese Patent Application No. 201520595538.1, dated Jul. 22, 2016, 3 pages (1 page of English Translation and 2 pages of Official copy).
Office Action received for Danish Patent Application No. PA201570667, dated Sep. 2, 2016, 2 pages.
Office Action received for Danish Patent Application No. PA201670320, dated Aug. 4, 2016, 9 pages.
Office Action received for Taiwanese Patent Application No. 104128705, dated Aug. 29, 2016, 18 pages (7 pages of English Translation and 11 pages of Official Copy).
Notice of Allowance received for Taiwanese Patent Application No. 104124998, dated Mar. 31, 2017, 3 pages (Official copy only) (See attached 37 CFR § 1.98(a)(3)).
Office Action received for Taiwanese Patent Application No. 104128705, dated Mar. 16, 2017, 3 pages (Official copy only) (See attached 37 CFR § 1.98(a)(3)).
Office Action received for Australian Patent Application No. 2015298710, dated Apr. 13, 2017, 3 pages.
Non Final Office Action received for U.S. Appl. No. 14/815,890, dated Jun. 6, 2017, 19 pages.
Sony, "Live View™ Micro Display", Extended User Guide, Aug. 2010, 27 pages.
Sony, "Sony SmartWatch", User Guide, Dec. 2011, 18 pages.
Notice of Allowance received for Taiwanese Patent Application No. 104124997, dated Jun. 16, 2017, 5 pages (1 page of English Translation of Search Report and 4 pages of Official Copy).

(56) References Cited

OTHER PUBLICATIONS

Notice of Allowance received for U.S. Appl. No. 14/815,879, dated Jun. 26, 2017, 8 pages.
Office Action received for Chinese Patent Application No. 201621208900.6, dated Apr. 26, 2017, 2 pages (Official Copy only) (see attached 37 CFR § 1.98(a) (3)).
Office Action received for Danish Patent Application No. PA201670319, dated Jun. 21, 2017, 6 pages.
Office Action received for Danish Patent Application No. PA201670320, dated Jul. 3, 2017, 4 pages.
Corrected Notice of Allowance received for U.S. Appl. No. 14/815,879, dated Jul. 13, 2017, 3 pages.
Non-Final Office Action received for U.S. Appl. No. 14/821,667, dated Jul. 14, 2017, 12 pages.
Office Action received for Japanese Patent Application No. 2017-505450, dated Jun. 20, 2017, 8 pages (4 pages of English Translation and 4 pages of Official Copy).
Office Action received for Korean Patent Application No. 10-2017-7005939, dated Jun. 30, 2017, 6 pages (2 pages of English Translation and 4 pages of Official copy).
Notice of Allowance received for Taiwanese Patent Application No. 104128684, dated Feb. 23, 2017, 3 pages (Official Copy only) (See attached 37 CFR § 1.98(a)(3)).
Office Action received for Chinese Patent Application No. 201520595384.6, dated Dec. 30, 2016, 2 pages (Official Copy only) (See attached 37 CFR § 1.98(a)(3)).
Office Action received for Chinese Patent Application No. 201520595385.0, dated Dec. 30, 2016, 2 pages (Official Copy only) (See attached 37 CFR § 1.98(a)(3)).
Geek, "How to Put the Day of the Week into the Windows Taskbar Clock", available online at: https://www.howtogeek.com/194103/how-to-put-the-day-of-the-week-into-the-windows-taskbar-clock/, 2014, 4 pages.
Gottabemobile, "How to Change Watch Faces on Android Wear", available online at URL:https://www.youtube.com/watch?v=B8iRGkGq6a8, Jul. 9, 2014, 4 pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/046262, dated Mar. 16, 2017, 26 pages.
"MS Excel 2013", Jan. 29, 2013, 2 pages.
Non-Final Office Action received for U.S. Appl. No. 14/839,889, dated Mar. 7, 2017, 26 pages.
Notice of Allowance received for Danish Patent Application No. PA201570495, dated Feb. 22, 2017, 1 page.
Office Action received for Australian Patent Application No. 2015298710, dated Feb. 15, 2017, 2 pages.
Office Action Received for Chinese Patent Application No. 201520595408.8, dated Dec. 30, 2016, 2 pages (Official Copy Only) (see attached 37 CFR § 1.98(a) (3)).
Office Action received for Chinese Patent Application No. 201520595538.1, dated Dec. 30, 2016, 2 pages (Official Copy only) (see attached 37 CFR § 1.98(a) (3)).
Office Action received for Danish Patent Application No. PA201570497, dated Feb. 21, 2017, 3 pages.
Office Action received for Dutch Patent Application No. 2015245, dated Jan. 24, 2017, 11 pages (1 page of English Translation and 10 pages of Official Copy).
Advisory Action received for U.S. Appl. No. 14/833,014, dated Jan. 27, 2017, 3 pages.
"Deluxe Moon—Guide", available online at:- https://web.archive.org/web/20130520161057/http://www.lifewaresolutions.com/deluxe_moon_guide_ip.html, May 20, 2013, 5 pages.
"Google Earth on Android—AndroidCentral.com", available online at:- https://www.youtube.com/watch?v=1WxN1RuhrE4, Feb. 22, 2010, 1 page.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Search Report and Written Opinion received for PCT Patent Application No. PCT/US2016/035090, dated Oct. 4, 2016, 17 pages.
Invitation to Pay Additional Fees received for PCT Patent Application No. PCT/US2016/035090, dated Jul. 15, 2016, 2 pages.
Non-Final Office Action received for U.S. Appl. No. 14/815,879, dated Dec. 15, 2016, 33 pages.
Notice of Allowance received for U.S. Appl. No. 14/815,898, dated Dec. 5, 2016, 3 pages.
Notice of Allowance received for U.S. Appl. No. 14/815,907, dated Nov. 30, 2016, 2 pages.
Office Action received for Australian Patent Application No. 2016100765, dated Dec. 16, 2016, 3 pages.
Office Action received for Danish Patent Application No. PA201570495, dated Dec. 9, 2016, 2 pages.
Office Action received for Danish Patent Application No. PA201570498, dated Feb. 6, 2017, 2 pages.
Office Action received for Danish Patent Appiication No. PA201670320, dated Dec. 5, 2016, 4 pages.
Office Action received for Taiwanese Patent Application No. 104124962, dated Nov. 29, 2016, 6 pages (3 pages of English Translation and 3 pages of Official Language).
Office Action received for Taiwanese Patent Application No. 104124998, dated Nov. 29, 2016, 6 pages (3 pages of English Translation and 3 pages of Official Language).
Office Action received for Taiwanese Patent Application No. 104124963, dated Jan. 5, 2017, 11 pages (5 pages of English Translation and 6 pages of Official Language).
Office Action received for Taiwanese Patent Application No. 104124995, dated Dec. 1, 2016, 6 pages (3 pages of English Translation and 3 pages of Official Language).
Office Action received for Taiwanese Patent Application No. 104124997, dated Dec. 8, 2016, 12 pages (5 pages of English Translation and 7 pages of Official Language).
Office Action received for Taiwanese Patent Application No. 104126627, dated Nov. 29, 2016, 9 pages (4 pages of English Translation and 5 pages of Official Language).
Office Action received for Taiwanese Patent Application No. 104128684, dated Nov. 8, 2016, 24 pages (9 pages of English Translation and 15 pages of Official Language).
Office Action received for Danish Patent Application No. PA201570499, dated Feb. 14, 2017, 2 pages.
Search Report and Opinion received for Dutch Patent Application No. 2015232, dated Jan. 25, 2017, 9 pages (1 page of English Translation and 8 pages of Official Language).
Smartwatch. "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages (1 page of English Translation and 8 pages of Official Language).
Viticci, Federico, "Checking Time Zones with Living Earth", MacStories, Dec. 11, 2013, 5 pages.
Non-Final Office Action received for U.S. Appl. No. 14/822,769, dated May 4, 2017, 21 pages.
Office Action received for Taiwanese Patent Application No. 104132636, dated Mar. 23, 2017, 25 pages (10 pages of English Translation and 15 pages of Official copy).

(56) References Cited

OTHER PUBLICATIONS

Office Action received for Chinese Patent Application No. 201510483305.7, dated Dec. 1, 2017, 13 pages (5 pages English Translation and 8 pages of Official Copy).
Office Action received for Chinese Patent Application No. 201510557356.X, dated Dec. 29, 2017, 11 pages (5 pages English translation and 6 pages of Official Copy).
Office Action received for Japanese Patent Application No. 2017-510631, dated Mar. 2, 2018, 12 pages (7 pages of English Translation and 5 pages of Official Copy).
Corrected Notice of Allowance received for U.S. Appl. No. 14/815,879, dated Jul. 28, 2017, 3 pages.
Block, Eliza, et al., U.S. Appl. No. 15/554,204 entitled "Sharing User-Configurable Graphical Constructs", filed on Aug. 28, 2017, 247 pages.
Bogdanov, Alexei, "SKMEI 1016", XP054977588, Available online at <URL:https://www.youtube.com/watch?v=E4q4Fug05Fw>, Jun. 21, 2014, 2 pages (Official Copy only) (see attached 37 CFR § 1.98(a) (3)).
Corrected Notice of Allowance received for U.S. Appl. No. 14/815,879, dated Sep. 21, 2017, 2 pages.
Examiner's Answer to Appeal Brief received for U.S. Appl. No. 14/833,014, dated Nov. 2, 2017, 48 pages.
Final Office Action received for U.S. Appl. No. 14/822,769, dated Jan. 4, 2018, 25 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
"Kidizoom Smartwatch", Available online at <URL:https://www.vtechnl.com/media/downloads/Kidizoom-Smart-Watch.pdf>, Jun. 24, 2014, 23 pages.
"New, but unsigned—Easy StopWatch for Symbian", XP55393563, Available online at <http://www.allaboutsymbian.com/flow/item/19490_New_but_unsigned-Easy_StopWatc.php>, Mar. 15, 2014, 15 pages.
Non-Final Office Action received for U.S. Appl. No. 14/841,606, dated Dec. 7, 2017, 30 pages.
Notice of Allowance received for Taiwanese Patent Application No. 104124962, dated Jul. 27, 2017, 3 pages (Official Copy only) (see attached 37 CFR § 1.98(a) (3)).
Notice of Allowance received for Taiwanese Patent Application No. 104124963, dated Sep. 28, 2017, 5 pages (1 page of English Translation of Search report and 4 pages of Official Copy) (see attached 37 CFR § 1.98(a) (3)).
Notice of Allowance received for Taiwanese Patent Application No. 104124995, dated Jul. 27, 2017, 3 pages (Official Copy only) (see attached 37 CFR § 1.98(a) (3)).
Notice of Allowance received for U.S. Appl. No. 14/839,889, dated Oct. 30, 2017, 16 pages.
Office Action received for Danish Patent Application No. PA201570499, dated Nov. 1, 2017, 6 pages.
Office Action received for European Patent Application No. 15730924.6, dated Dec. 12, 2017, 8 pages.
Office Action received for Danish Patent Application No. PA201570497, dated Oct. 24, 2017, 2 pages.
Office Action received for Danish Patent Application No. PA201570498, dated Oct. 26, 2017, 5 pages.
Office Action received for Danish Patent Application No. PA201670320, dated Jan. 18, 2018, 2 pages.
Office Action received for Taiwanese Patent Application No. 104132636, dated Oct. 31, 2017, 10 pages (4 pages of English Translation and 6 pages of Official Copy).
Rehman, A, "Install Android 4.2 Gesture-Based Keyboard & Clock App on Jelly Bean 4.1 or Higher", Available online at <http://www.addictivetips.com/android/install-android-4-2-keyboard-clock-app-apk-on-jelly-bean-4-1-x/>, Nov. 3, 2012, 4 pages.
Search Report and Opinion received for Netherlands Patent Application No. 2015242, dated Jul. 4, 2017, 20 pages (10 pages of English Translation of Search Opinion and 10 pages of official copy).
Search Report and Opinion received for Netherlands Patent Application No. 2015364, dated Jul. 4, 2017, 12 pages (5 pages of English Translation of Search Opinion and 7 pages of official copy).
Search Report and Opinion received for Netherlands Patent Application No. 2018531, dated Jul. 27, 2017, 14 pages (6 pages of English Translation and 8 pages of Official Copy).
Talkandroid, "Android Wear walkthrough", Available online at: https://www.youtube.com/watch?v=4xntpZac4sw, Jun. 30, 2014, 1 page.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Final Office Action received for U.S. Appl. No. 14/815,890, dated Feb. 26, 2018, 20 pages.
Invitation to Pay Additional Fee received for European Patent Application No. 15747595.5, dated Feb. 9, 2018, 6 pages.
Notice of Allowance received for Japanese Patent Application No. 2017-505450, dated Mar. 9, 2018, 10 pages (7 pages of English Translation and 3 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Dec. 1, 2017, 11 pages (5 pages of English Translation and 6 pages of Official Copy).
International Preliminary Report on Patentability received for PCT Patent Application No. PCT/US2016/017271, dated Sep. 21, 2017, 13 pages.
Cyr, Jim, "Apple Watch—Customize Modular Watch Face", available online at: https://www.youtube.com/watch?v=02W93HbKIK8, May 13, 2015, 2 pages.
Final Office Action received for U.S. Appl. No. 14/815,890, dated Nov. 21, 2016, 18 pages.
Final Office Action received for U.S. Appl. No. 14/833,014, dated Oct. 26, 2016, 32 pages.
Final Office Action received for U.S. Appl. No. 14/822,769, dated Nov. 9, 2016, 18 pages.
Notice of Allowance received for Danish Patent Application No. PA201570667, dated Nov. 11, 2016, 2 pages.
Notice of Allowance received for U.S. Appl. No. 14/815,898, dated Oct. 24, 2016, 14 pages.
Office Action received for Danish Patent Application No. PA201570497, dated Nov. 15, 2016, 2 pages.
Office Action received for Danish Patent Application No. PA201670319, dated Nov. 24, 2016, 7 pages.
Office Action received for Netherlands Patent Application No. 2015239, dated Oct. 28, 2016, 13 pages (5 pages of English Translation and 8 pages of Official Copy).

* cited by examiner

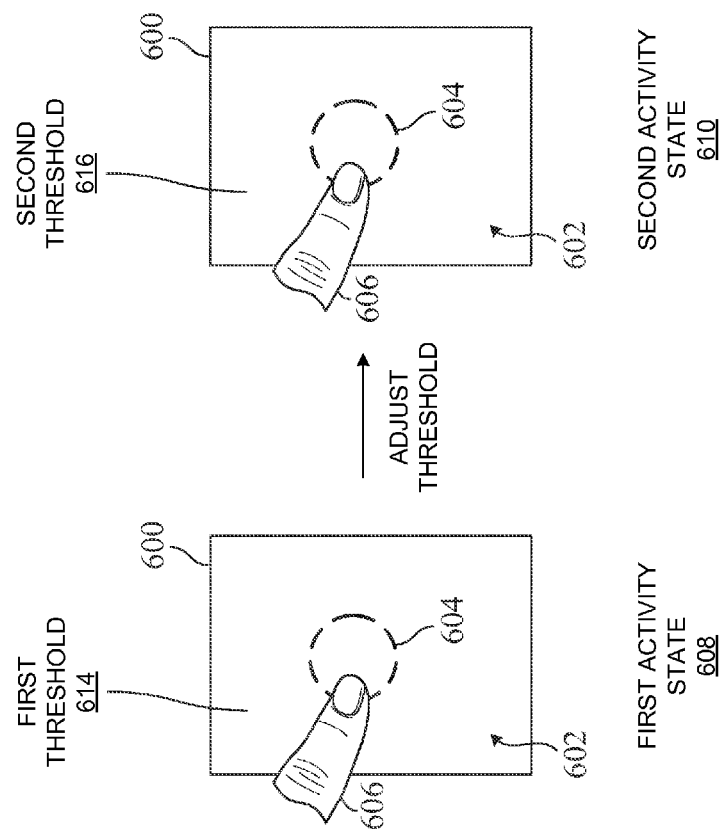

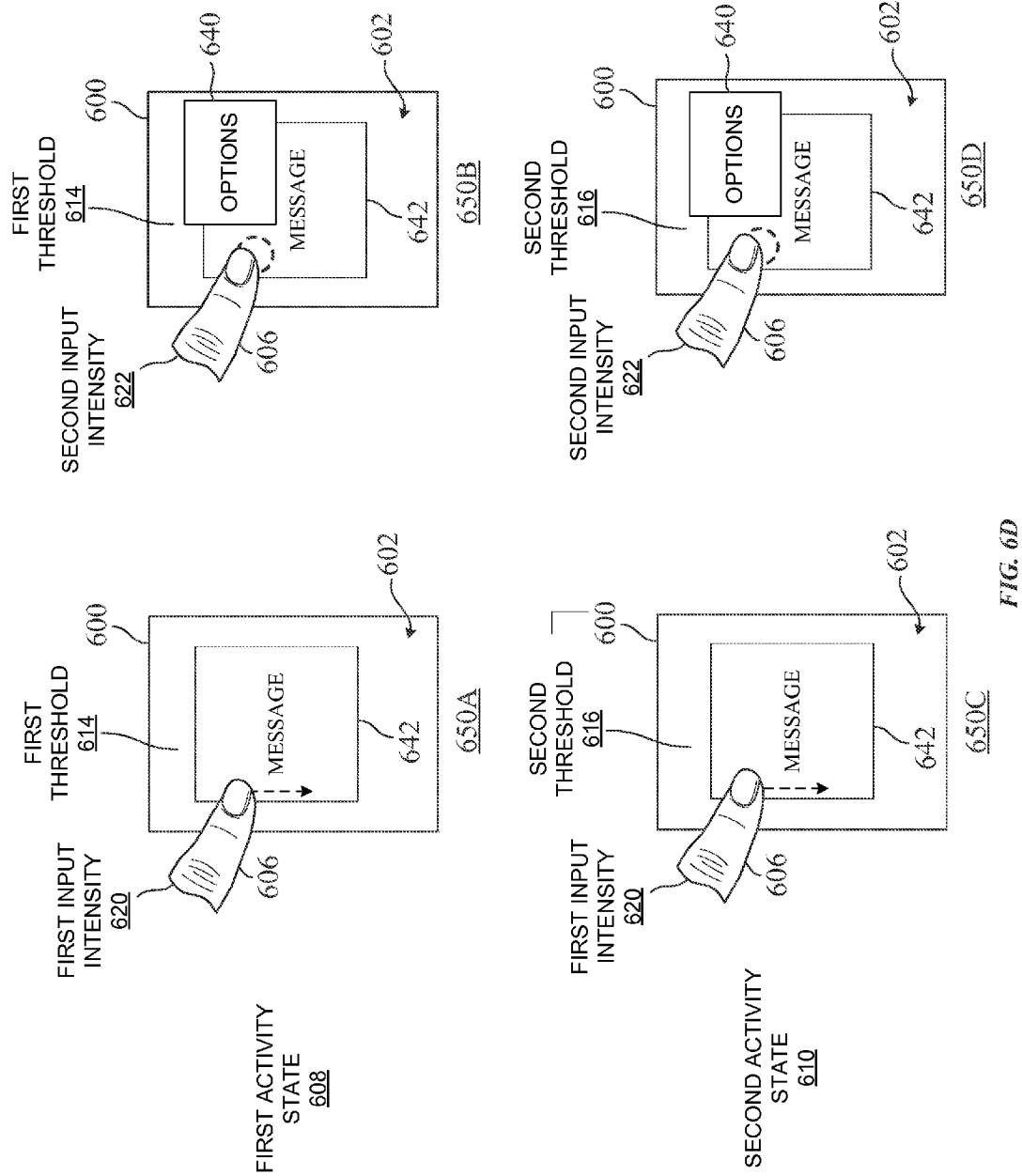

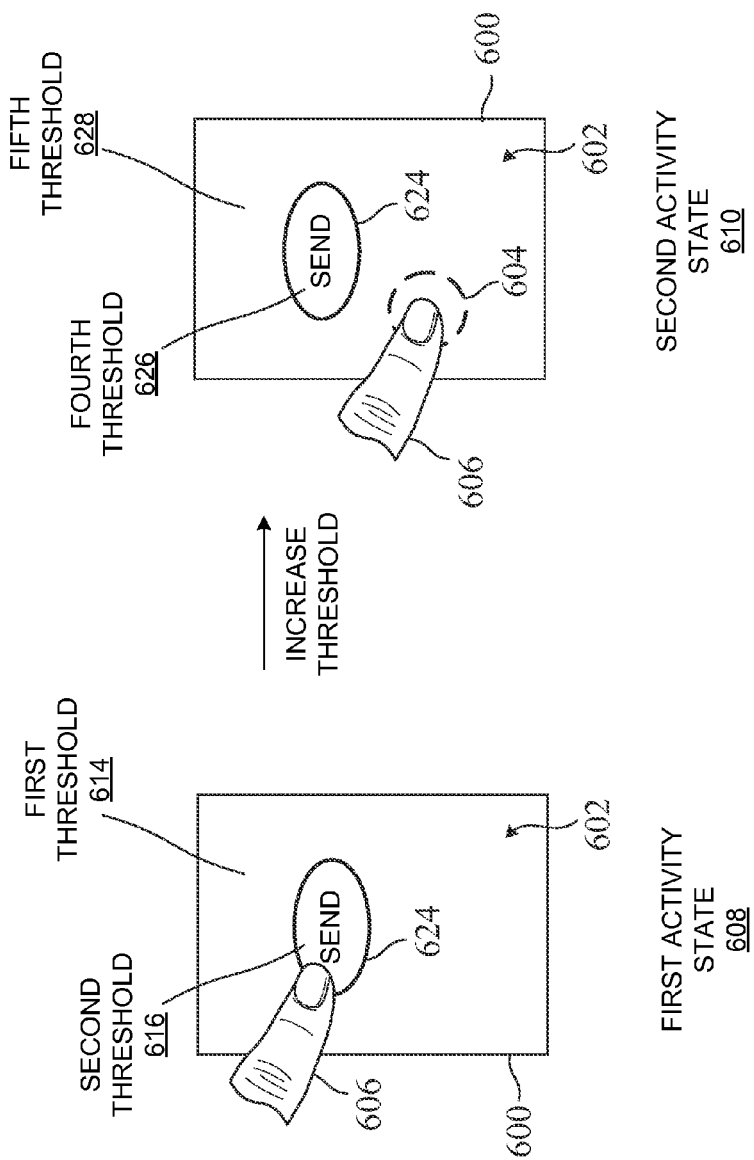

ACTIVITY BASED THRESHOLDS AND FEEDBACKS

CROSS-REFERENCE TO RELATED APPLICATIONS

This application claims priority to U.S. Provisional Application 62/129,823, filed Mar. 7, 2015, entitled "ACTIVITY BASED THRESHOLDS AND FEEDBACKS". The content of that application is hereby incorporated by reference in its entirety.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application," filed May 8, 2013, published as WIPO Publication No. WO/2013/169849; and International Patent Application Serial No. PCT/US2013/069483, entitled "Device, Method, and Graphical User Interface for Transitioning Between Touch Input to Display Output Relationships," filed Nov. 11, 2013, published as WIPO Publication No. WO/2014/105276; each of which is hereby incorporated by reference in their entirety.

FIELD

The present disclosure relates generally to computer user interfaces, and more specifically to techniques for varying threshold and feedback based on activity.

BACKGROUND

The use of electronic devices has significantly increased in recent years (e.g., accessing music and sending/receiving messages). Devices receive input from the user, such as a selection of a song for playback, a selection of a message recipient from a phonebook, a textual input for a message body, and a selection of a particular page of a document. As a result of the increased use of devices, the frequency of user input into such devices has also significantly increased. Further, users may use electronic devices under different conditions that may affect the manner in which they provide input that the device must correctly process.

Specifically, a user may engage in activity while using an electronic device. As the user engages in such activity, the user may interact with the electronic device in various ways. For example, a user may touch a screen of the electronic device to perform a process (e.g., send a message). However, during some types of activities, the user may not effectively or accurately touch the screen or otherwise manipulate the electronic device. In other words, certain types of activities (e.g., strenuous) may cause the user to inadvertently trigger a process while attempting to perform a different process through a touch on the screen. Such errors create a cognitive burden on the user. In addition, such errors result in repeated input and longer processes, thereby wasting energy. This latter consideration is particularly important in batter-operated devices.

BRIEF SUMMARY

Accordingly, there is a need for electronic devices with effective, more accurate and efficient systems, methods and interfaces for varying threshold(s) based on activity. Such methods and interfaces reduce the cognitive and/or physical burden on a user and produce a more efficient human-machine interface. For battery-operated computing devices, such methods and interfaces may conserve power and increase the time between battery charges.

In accordance with some embodiments, the present disclosure relates to systems and methods for varying threshold(s) based on activity. One example may include, at an electronic device including a touch sensitive display: displaying, on the touch sensitive display, a graphical user interface (GUI). The systems and methods may further include receiving an input representing a contact with the GUI, the input having an input intensity. In addition, the systems and methods may include in response to receiving the input and in accordance with a determination that the electronic device is in a first activity state, determining whether the input intensity of the input meets or exceeds a first characteristic intensity threshold. The systems and methods may include, in accordance with a determination that the input intensity of the input meets or exceeds the first characteristic intensity threshold, performing an application process. Moreover, the systems and methods may include, in response to receiving the input and in accordance with a determination that the electronic device is in a second activity state, determining whether the input intensity of the input meets or exceeds a second characteristic intensity threshold higher than the first characteristic intensity threshold. Additionally, the systems and methods may include, in accordance with a determination that the input intensity of the input meets or exceeds the second characteristic intensity threshold, performing the application process.

In accordance with some embodiments, the present disclosure also relates to systems and methods for varying haptic feedback based on activity. One example may include, at an electronic device including a touch sensitive display: displaying, on the touch sensitive display, a graphical user interface (GUI); receiving an input representing a contact with the GUI, the input having an input intensity. The systems and methods may include, in response to receiving the input and in accordance with a determination that the electronic device is in a first activity state, determining whether the input intensity of the input meets or exceeds a first characteristic intensity threshold. Additionally, the systems and methods include, in accordance with a determination that the input intensity of the input meets or exceeds the first characteristic intensity threshold, providing a haptic feedback of a first feedback level. The systems and methods further include, in response to receiving the input and in accordance with a determination that the electronic device is in a second activity state, determining whether the input intensity of the input meets or exceeds a second characteristic intensity threshold higher than the first characteristic intensity threshold. In addition, the systems and methods may include in accordance with a determination that the input intensity of the input meets or exceeds the second characteristic intensity threshold, providing a haptic feedback of a second feedback level higher than the first feedback level.

Thus, devices are provided with faster, more efficient methods and interfaces for varying threshold(s) based on activity, thereby increasing the effectiveness, efficiency, and user satisfaction with such devices. Such methods and interfaces may complement or replace other systems and methods for varying threshold(s) based on activity.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6F illustrate exemplary user interfaces for receiving user input on a touch-sensitive display having varying threshold(s) in accordance with some embodiments.

DESCRIPTION OF EMBODIMENTS

Figure 1A:
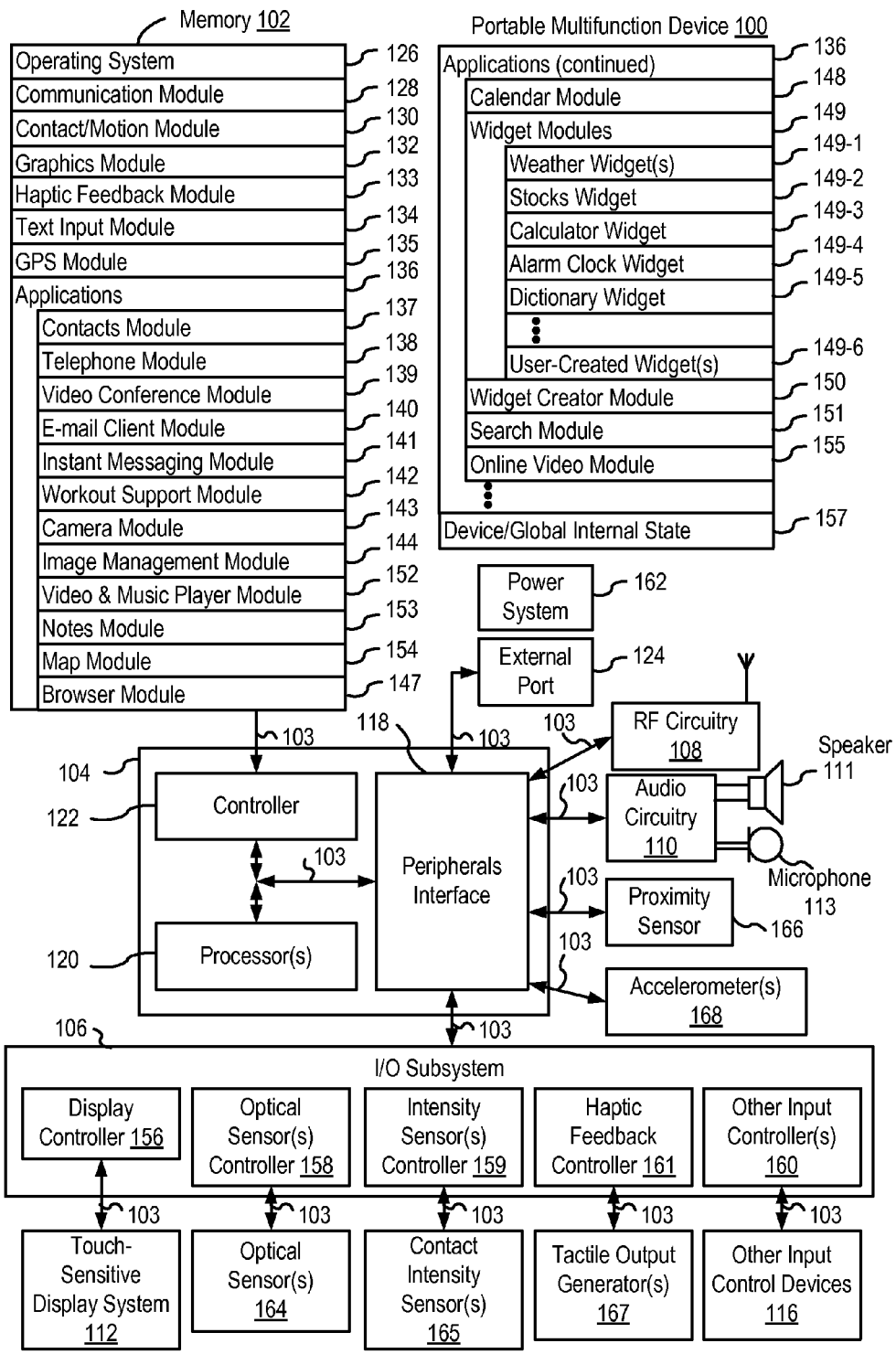
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The present aspects relate to varying one or more thresholds based on activity. For example, as a user engages in an activity (e.g., walking), the user may interact with the electronic device by touching a touch-sensitive surface to perform an application process (e.g., send a message). However, during some types of activities (e.g., running), the user may not effectively or accurately touch the screen or otherwise manipulate the electronic device in such a way that reflects the user's desire or intention. That is, certain types of activities (e.g., strenuous activities such as, but not limited to, running) may prevent the user from contacting the touch-sensitive display in such a way so as to trigger a desired application, and/or may cause the user to inadvertently trigger a process while attempting to perform a different process through a touch on the screen. As such, it may be desirable to vary or adjust a threshold based on an activity. In some aspects, the threshold may alternatively be referred to as a characteristic intensity threshold.

Accordingly, there is a need for electronic devices that provide efficient systems, methods and interfaces for varying threshold(s) based on activity and providing effective and accurate touch/contact detection during periods of different activity. Such techniques can reduce the cognitive and/or physical burden on a user who may touch/contact the touch-sensitive surface during various activities, thereby enhancing productivity. Further, such techniques may also reduce processor and battery power otherwise wasted on redundant user inputs.

Below, FIGS. 1A-1B, 2, 3, 4A-4B, and 5A-5B provide a description of exemplary devices for performing the techniques for varying a characteristic intensity threshold based on activity, receiving an input on a touch-sensitive display having varying characteristic intensity thresholds based on activity, and/or providing a varying haptic feedback level based on activity. FIGS. 6A-6F illustrate example user interfaces for varying a characteristic intensity threshold based on activity, receiving an input on a touch-sensitive display having varying characteristic intensity thresholds based on activity, and/or providing a varying haptic feedback level based on activity. FIGS. 7 and 8 are flow diagrams illustrating methods receiving user input on a touch-sensitive display of varying threshold(s) and providing haptic feedback, in accordance with some embodiments. The user interfaces in FIGS. 6A-6F are used to illustrate the processes described below, including the processes in FIGS. 7 and 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
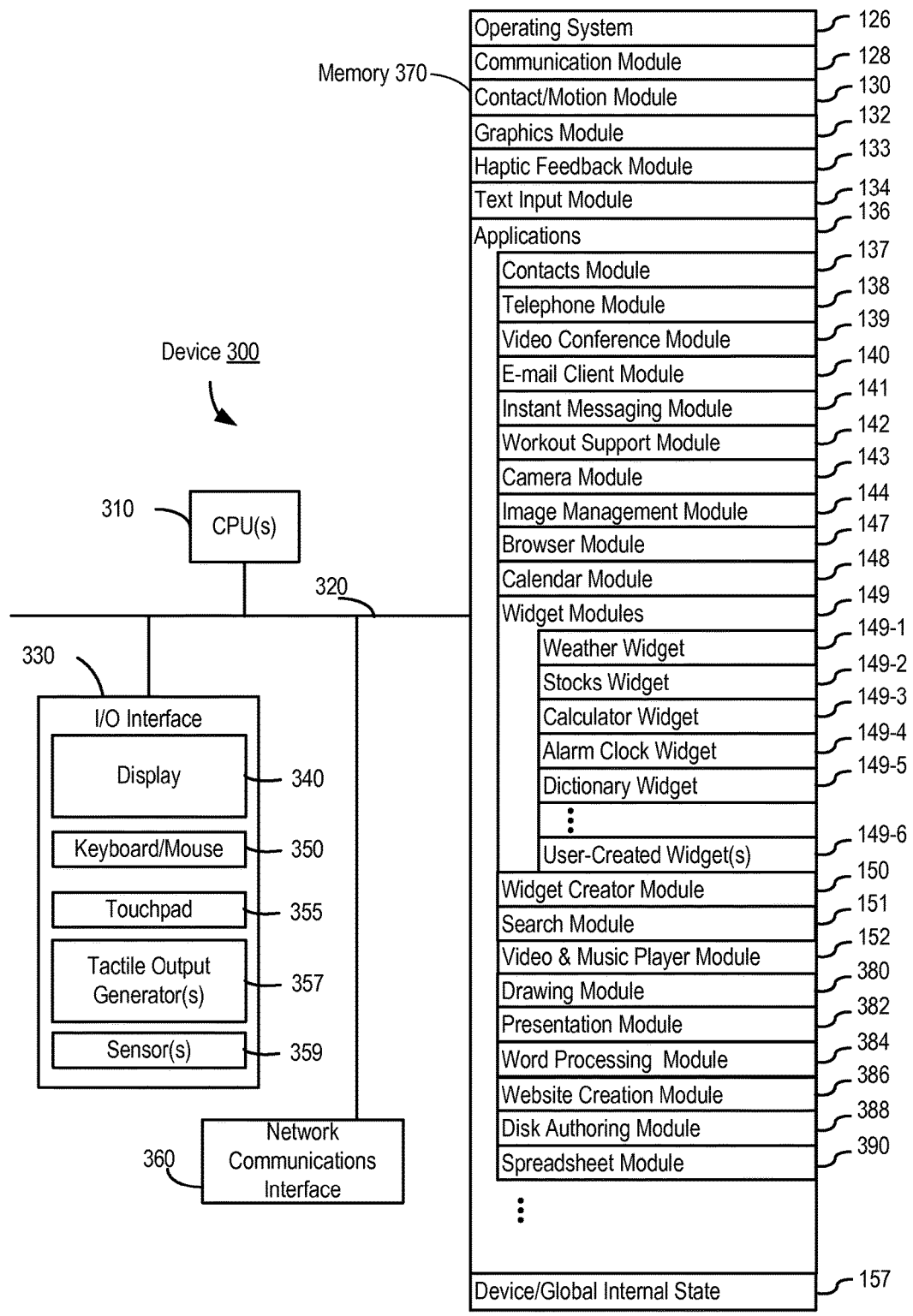
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
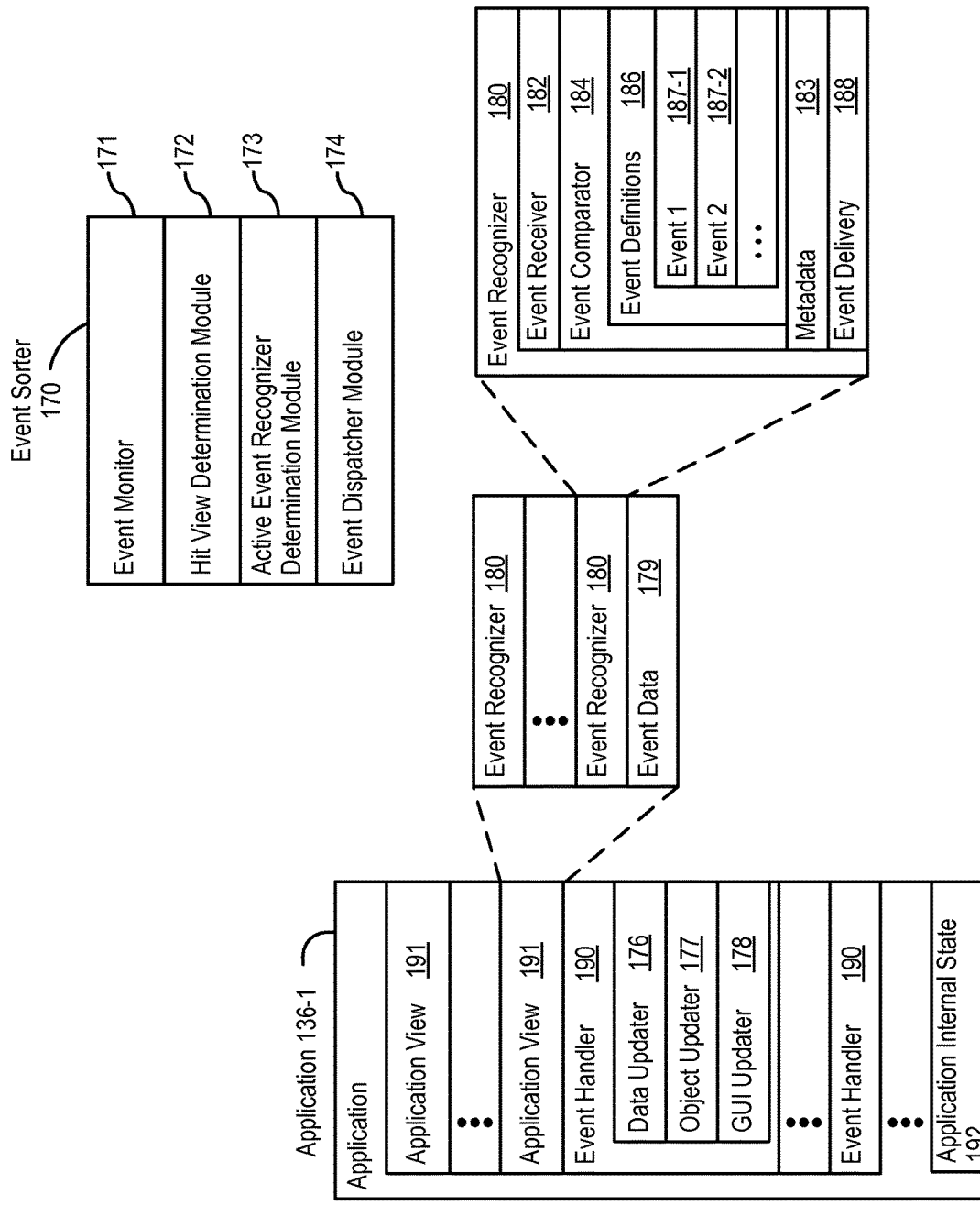
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
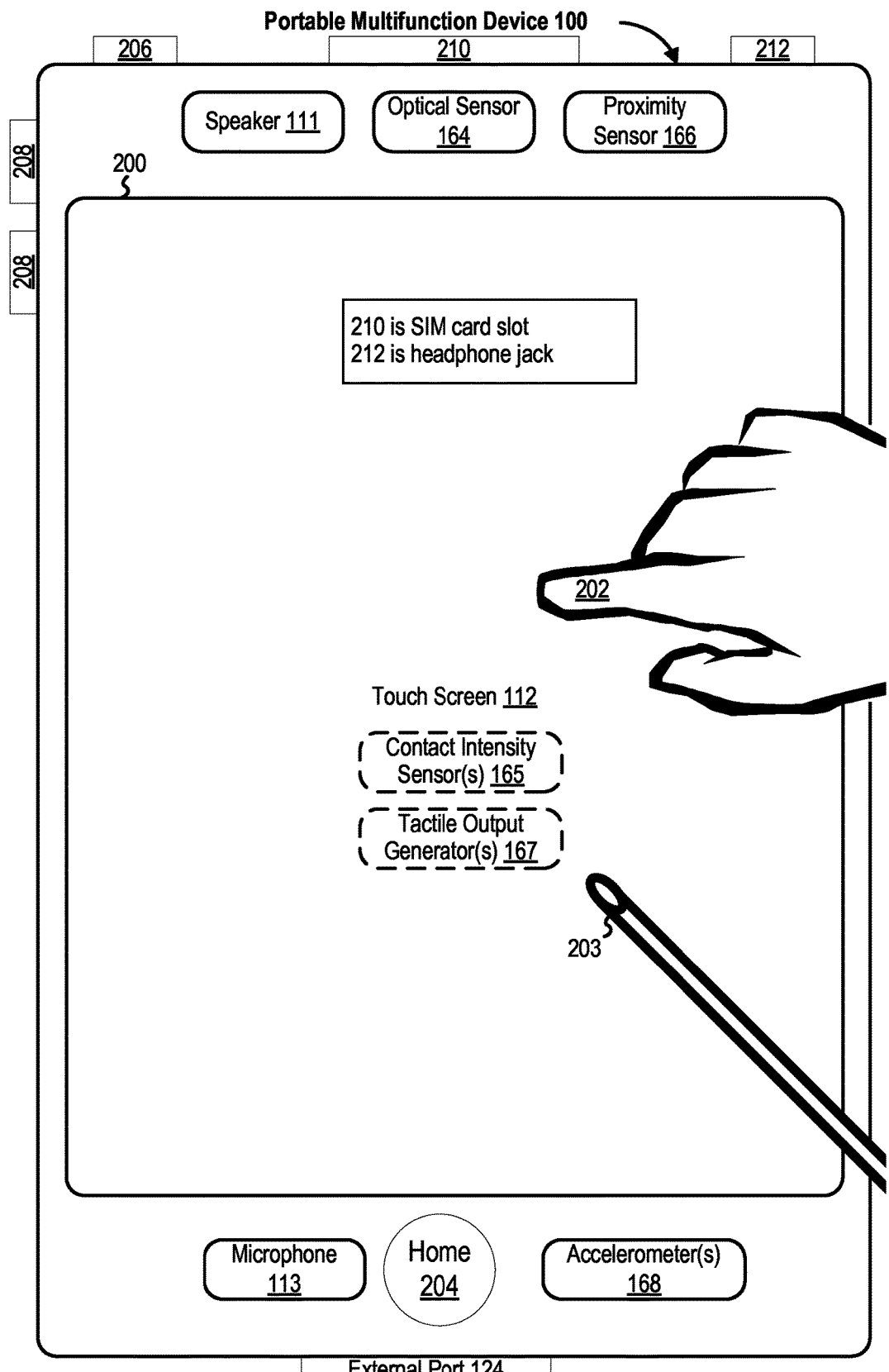
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
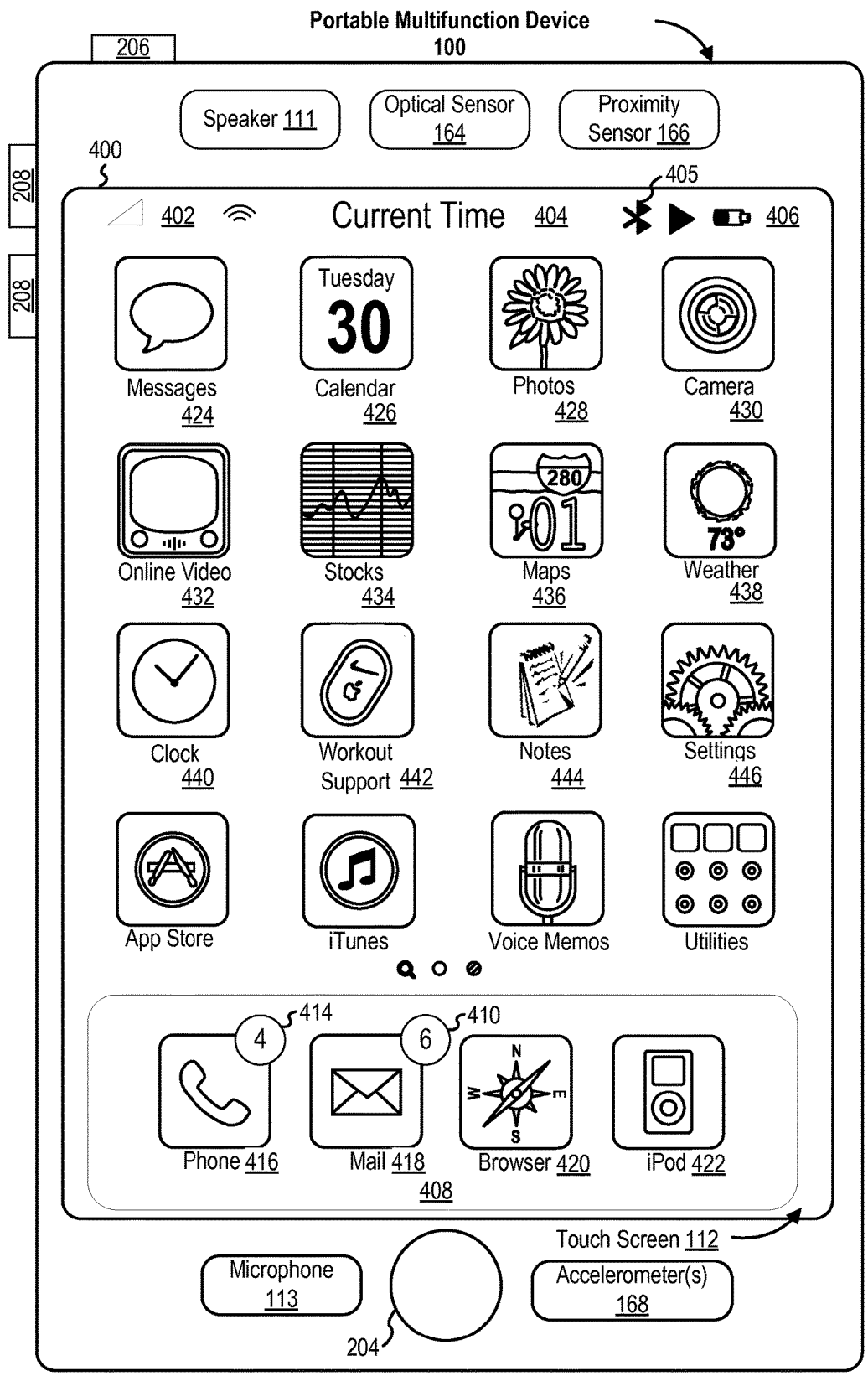
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
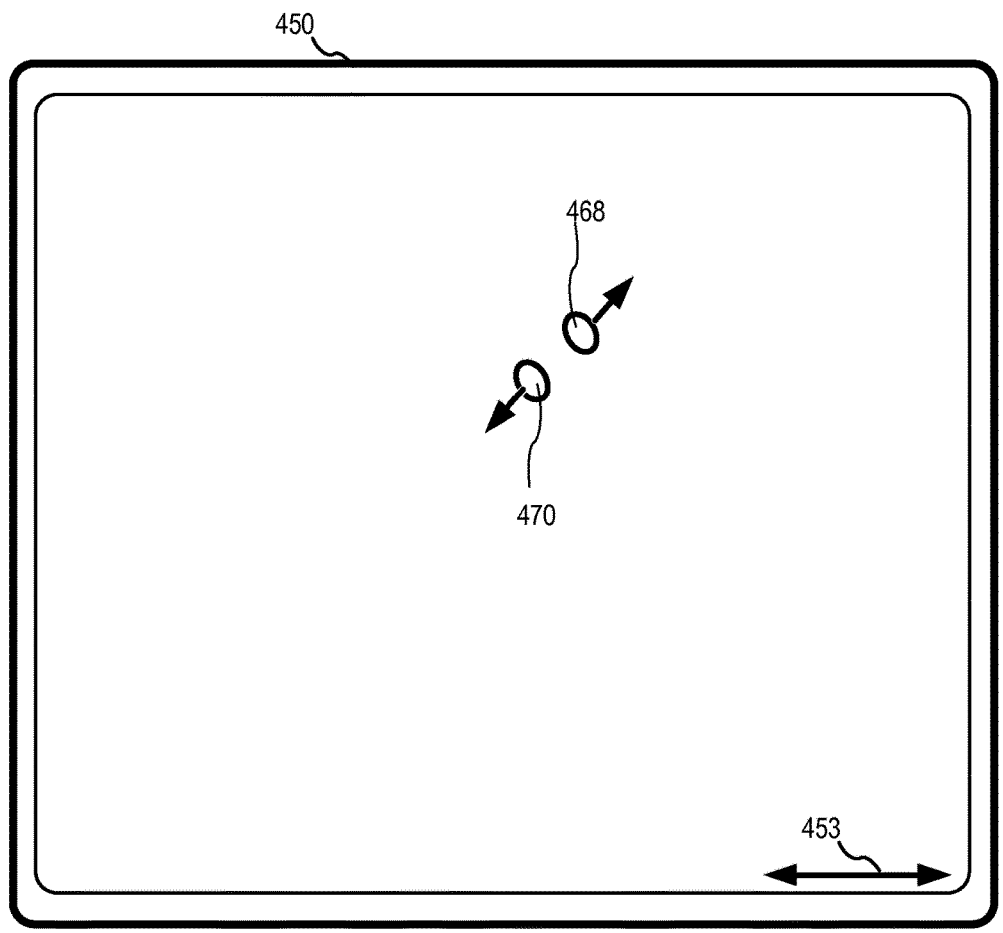
FIG. 4B illustrates an exemplary user interface for a multifunction device with a touch-sensitive surface that is separate from the display in accordance with some embodiments.
Figure 4B:
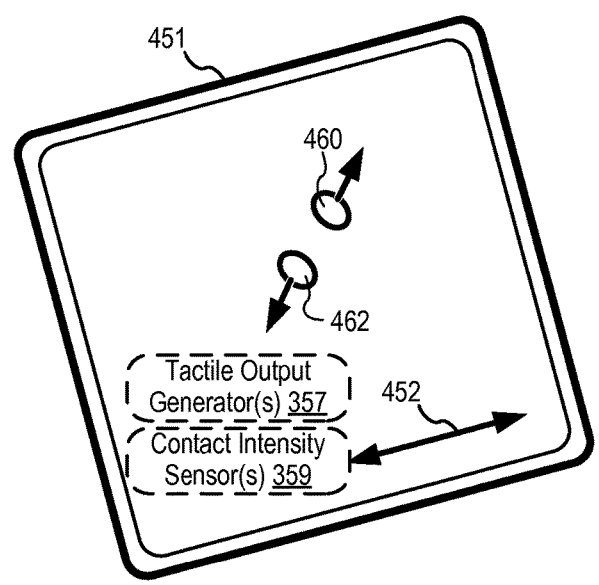

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
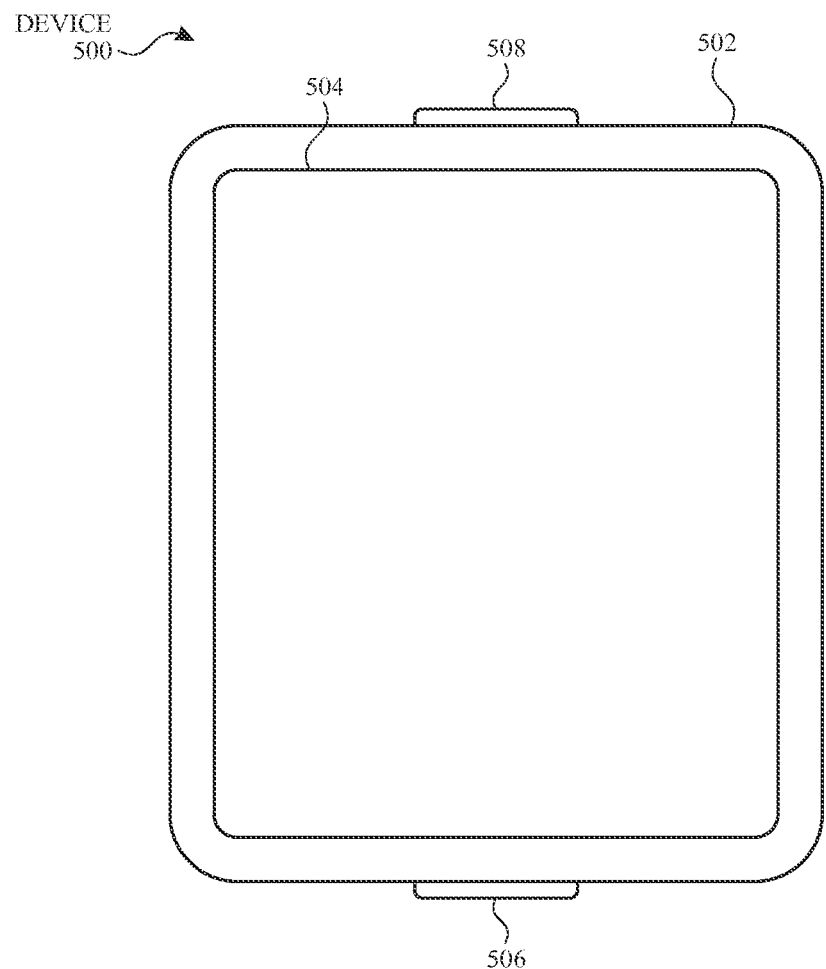
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
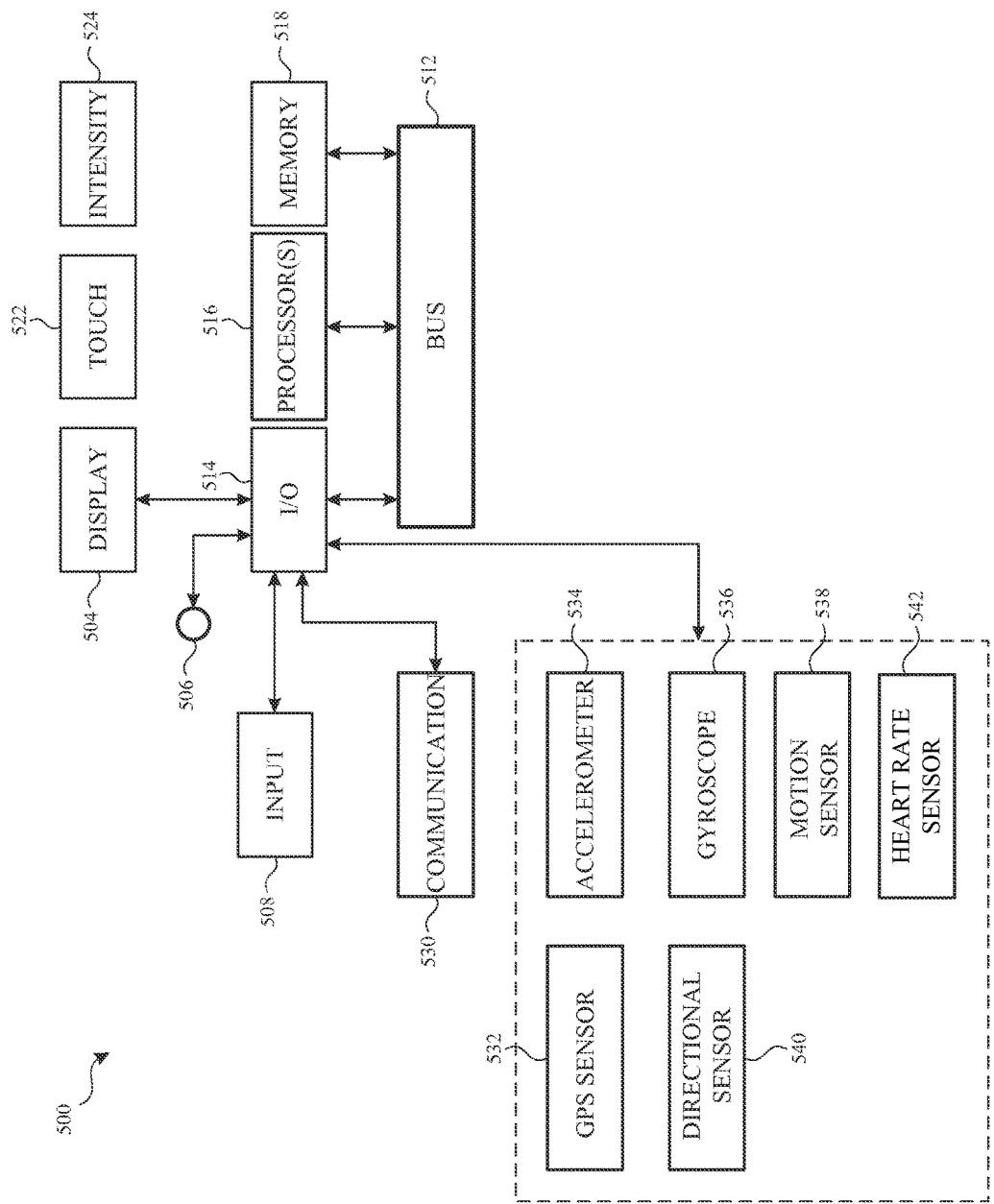
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, heart rate sensor 542, and/or a combination thereof, all of which can be operatively connected to I/O section 514.

Figure 7A:
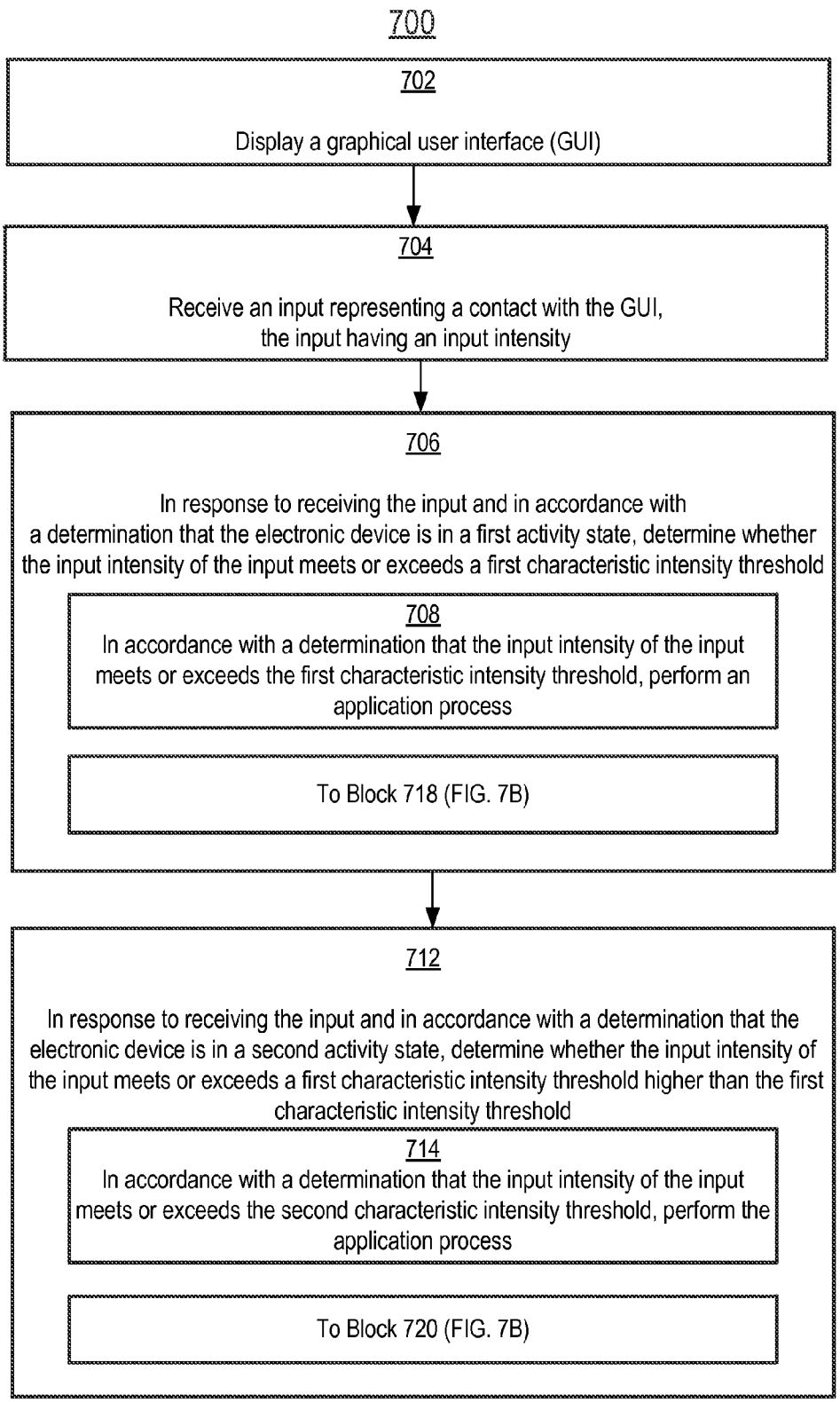
FIGS. 7A-7C are flow diagrams illustrating an example process for receiving user input on a touch-sensitive surface of varying threshold(s) in accordance with some embodiments.
Figure 7B:
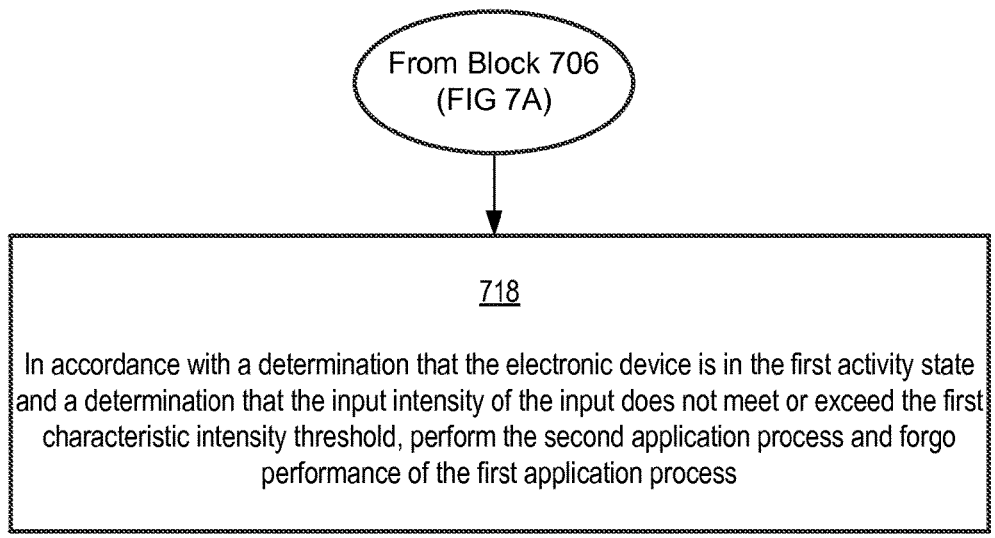
Figure 7B:
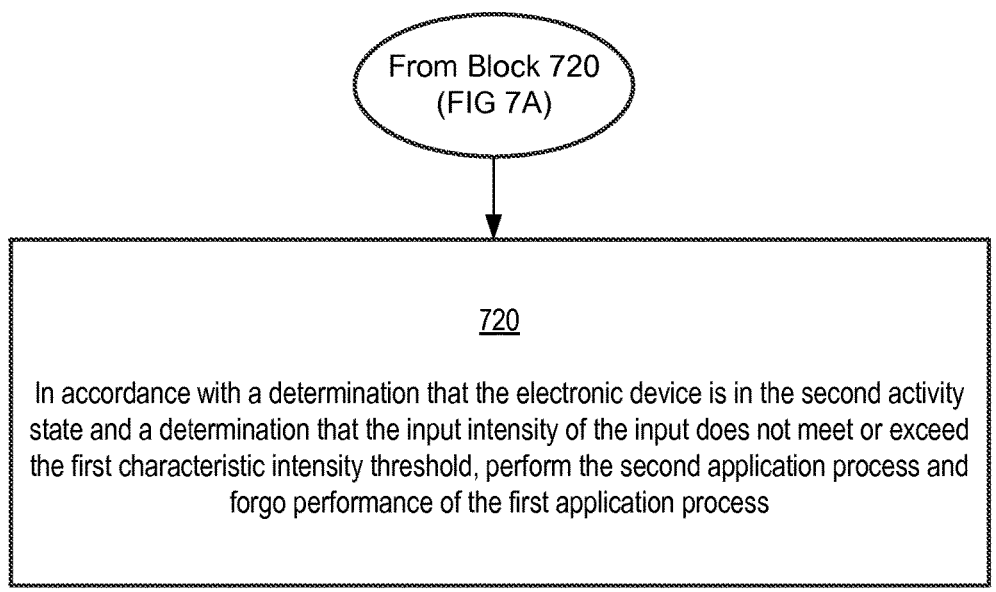
Figure 7C:
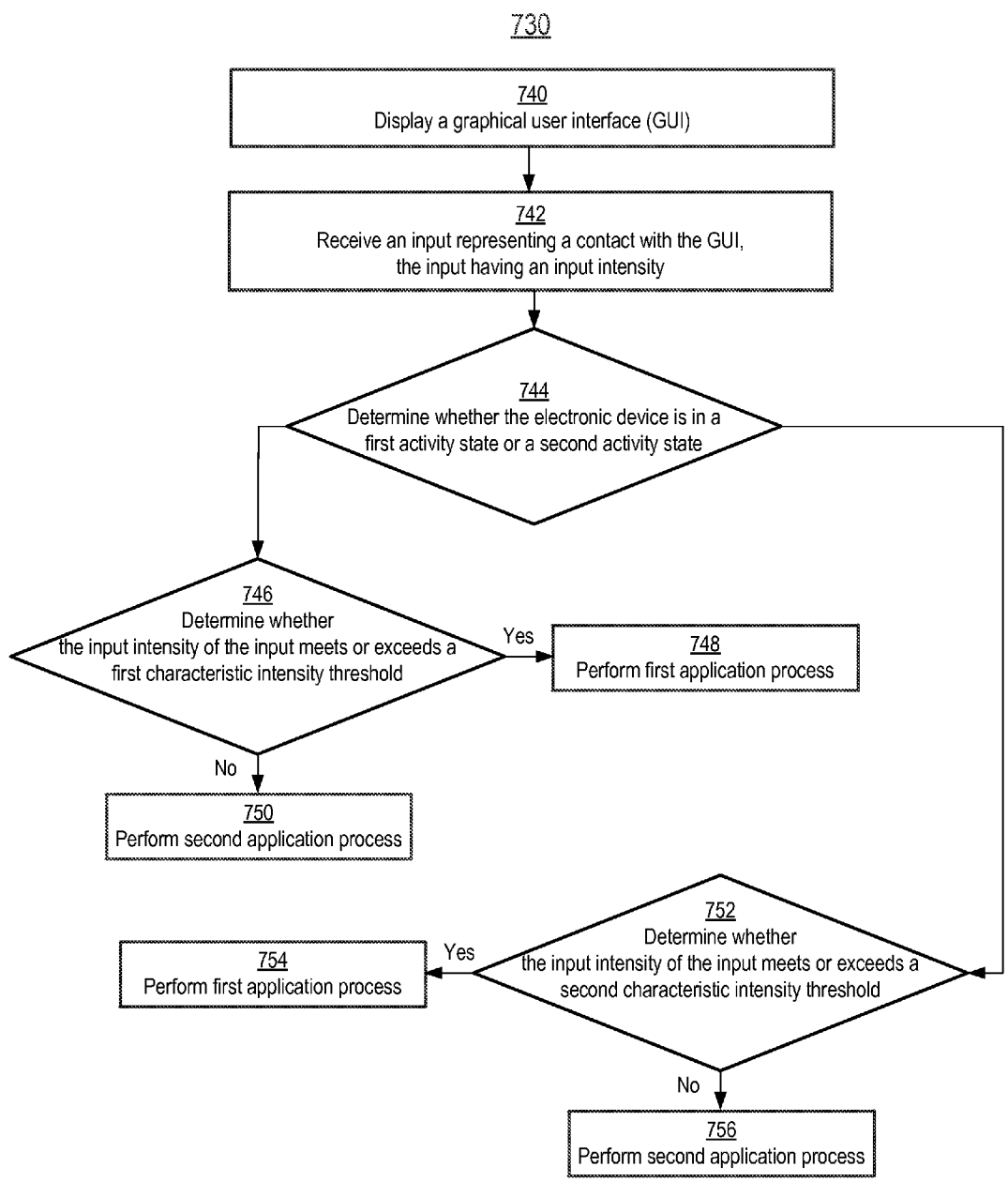
Figure 8A:
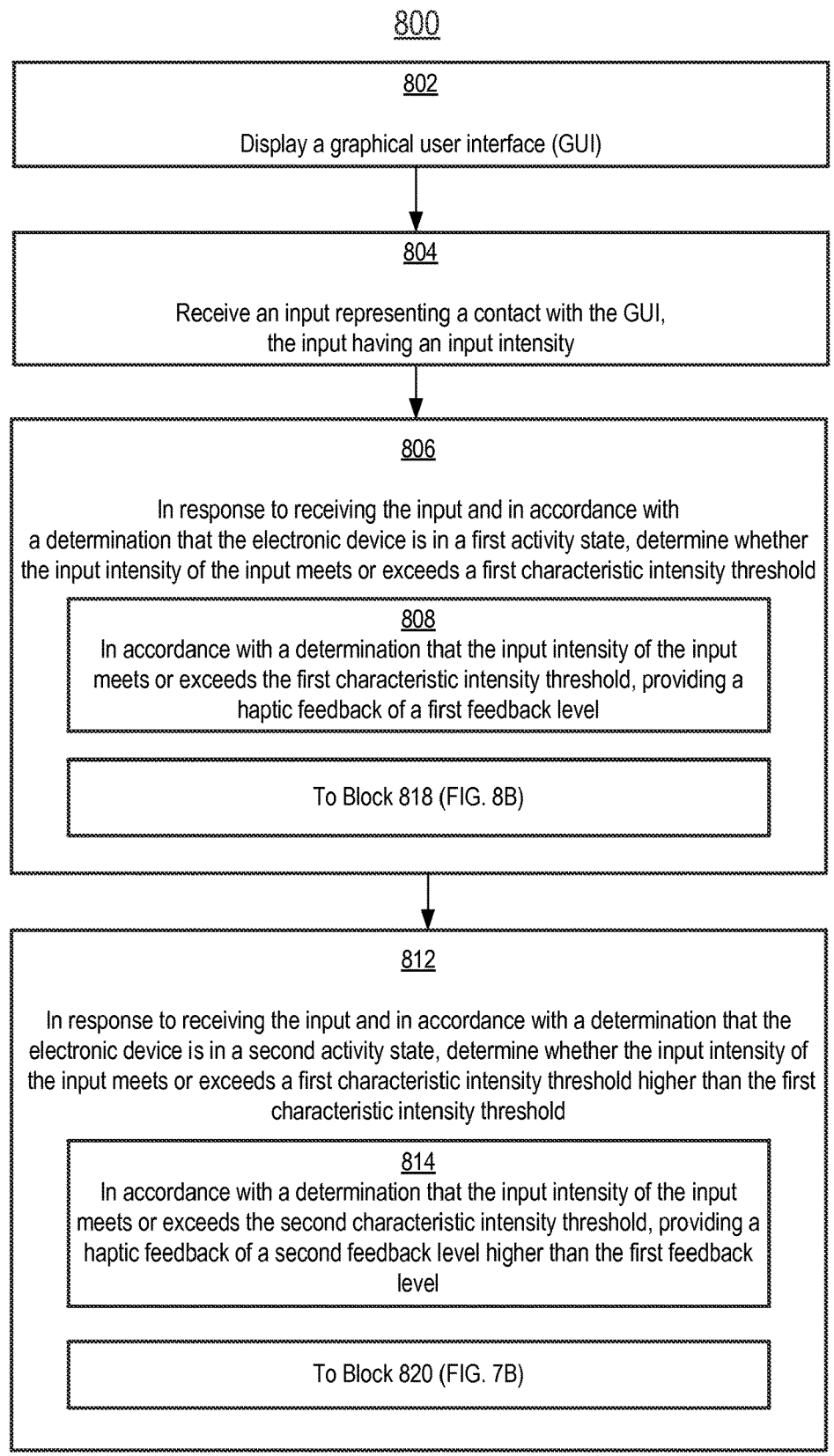
FIGS. 8A-8C are flow diagrams illustrating an example process for providing haptic feedback in accordance with some embodiments.
Figure 8B:
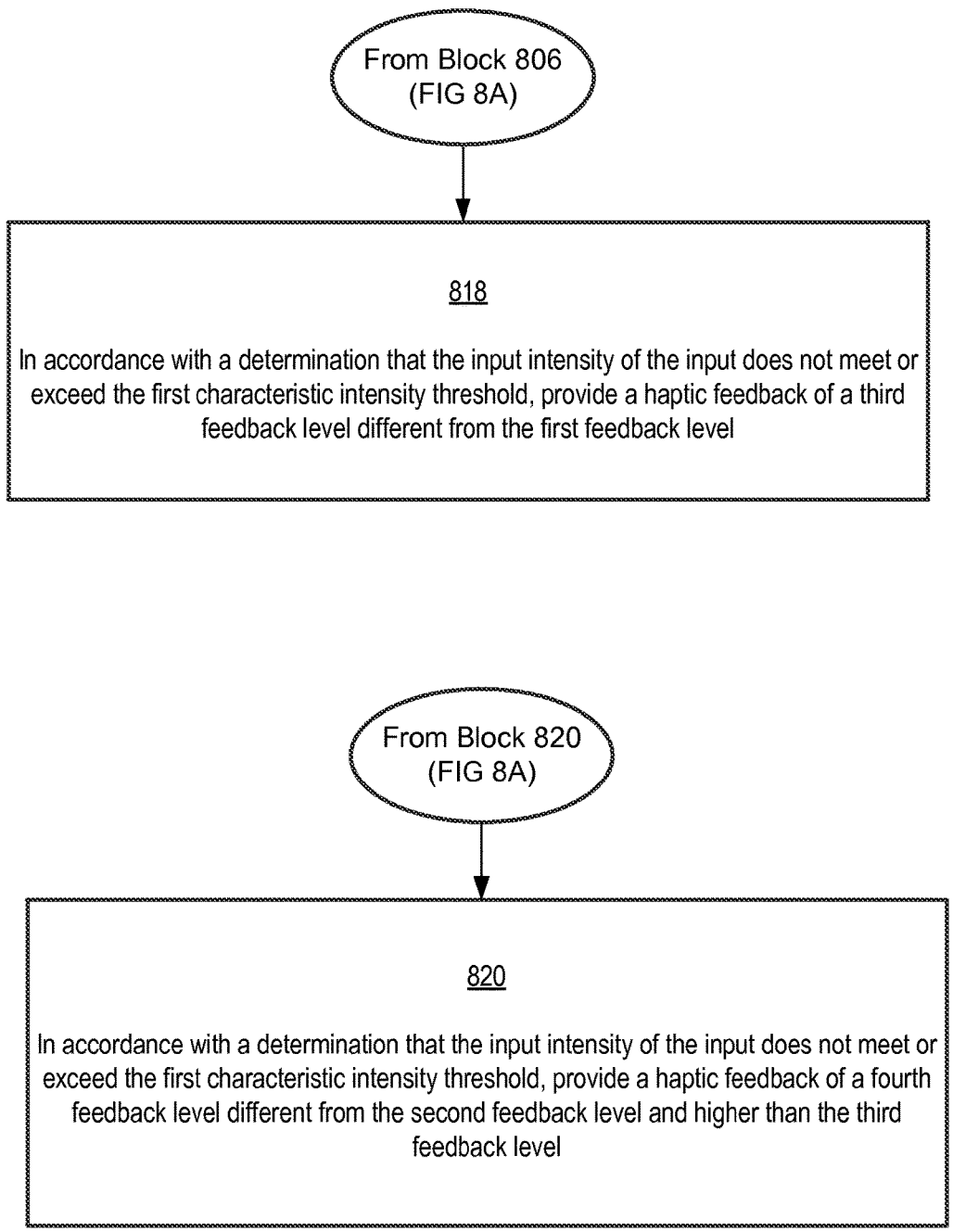
Figure 8C:
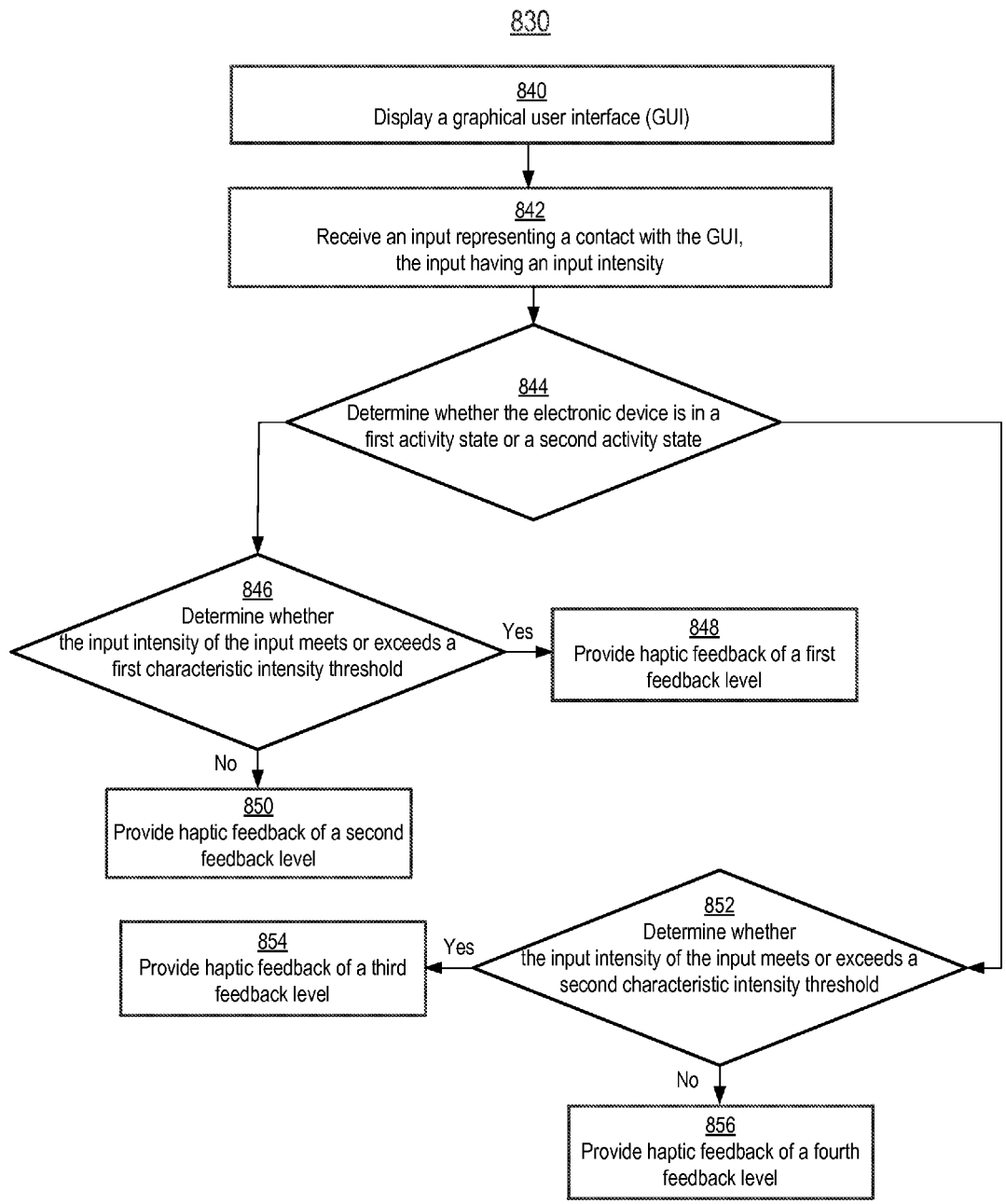

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 (FIGS. 7A-7C) and 800 (FIGS. 8A-8C). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
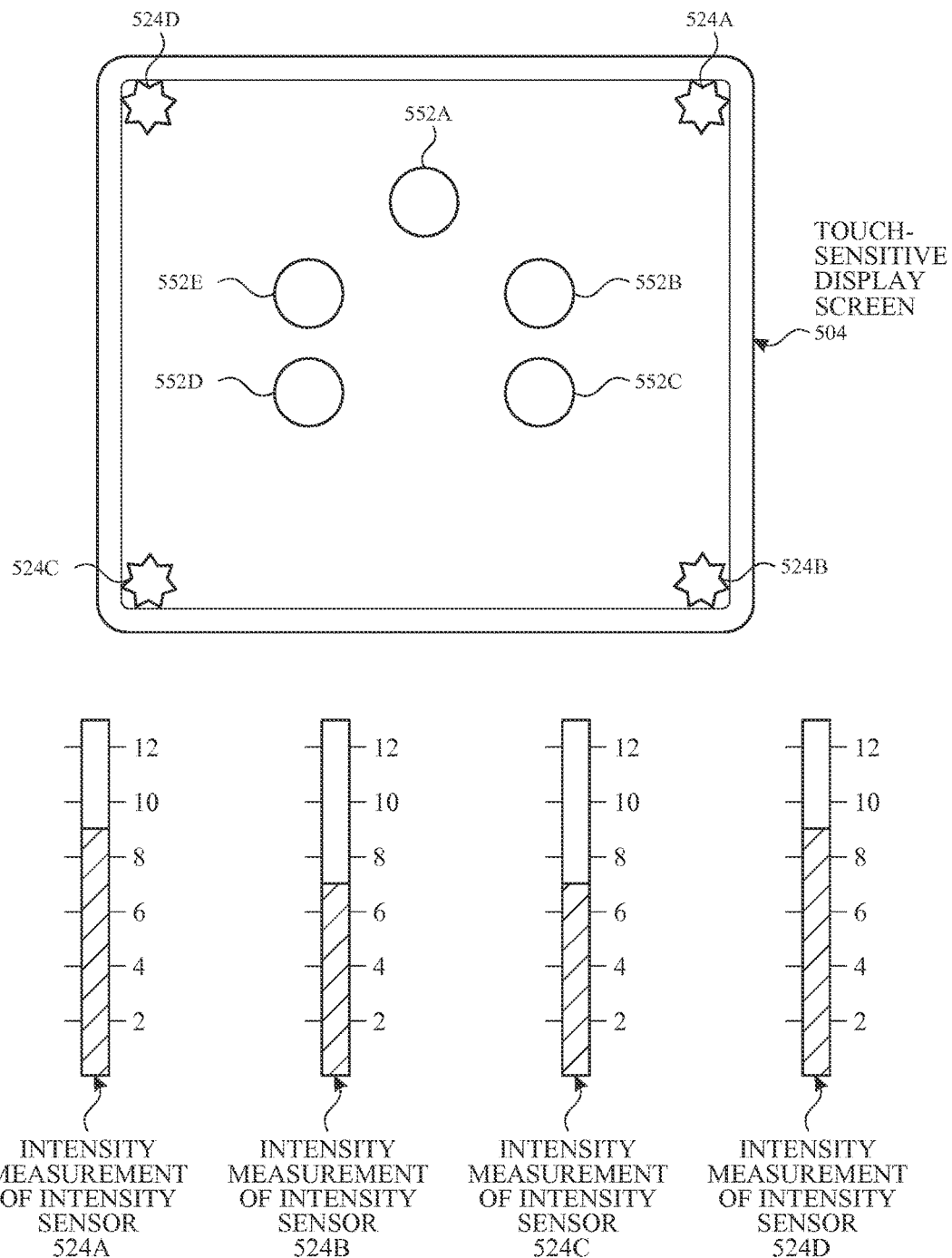
FIGS. 5C-5D illustrate exemplary components of a personal electronic device having a touch-sensitive display and intensity sensors in accordance with some embodiments.
Figure 5D:
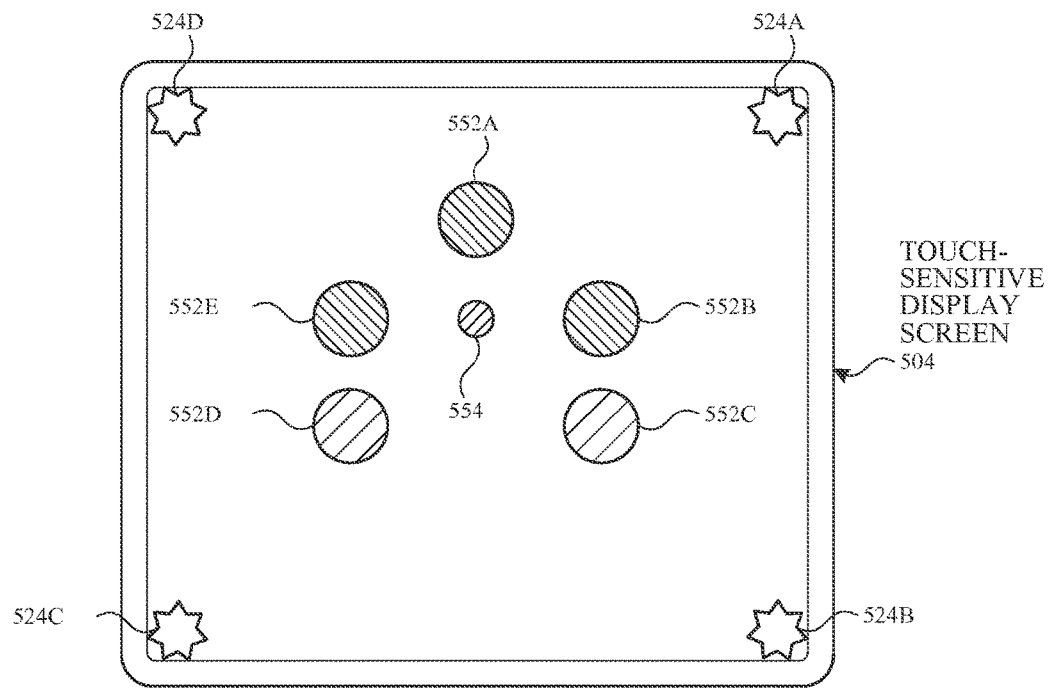
Figure 5D:
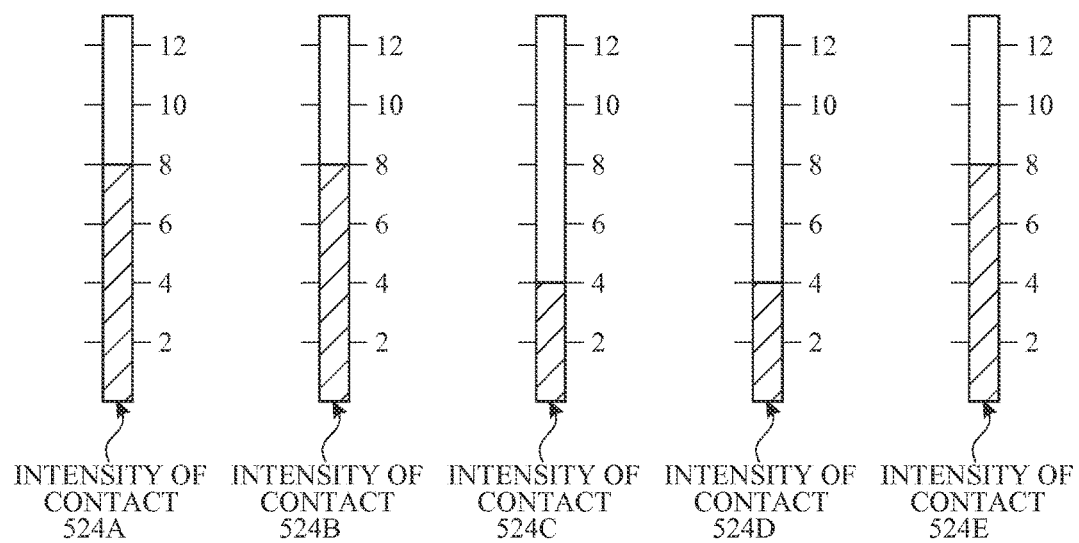

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
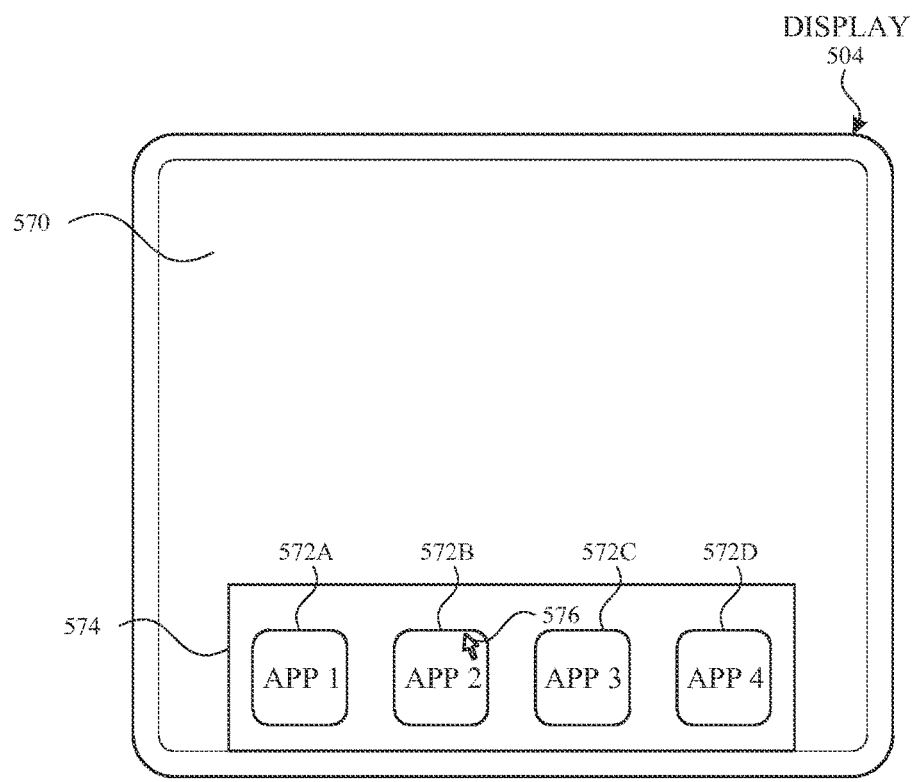
FIGS. 5E-5H illustrate exemplary components and user interfaces of a personal electronic device in accordance with some embodiments.
Figure 5E:
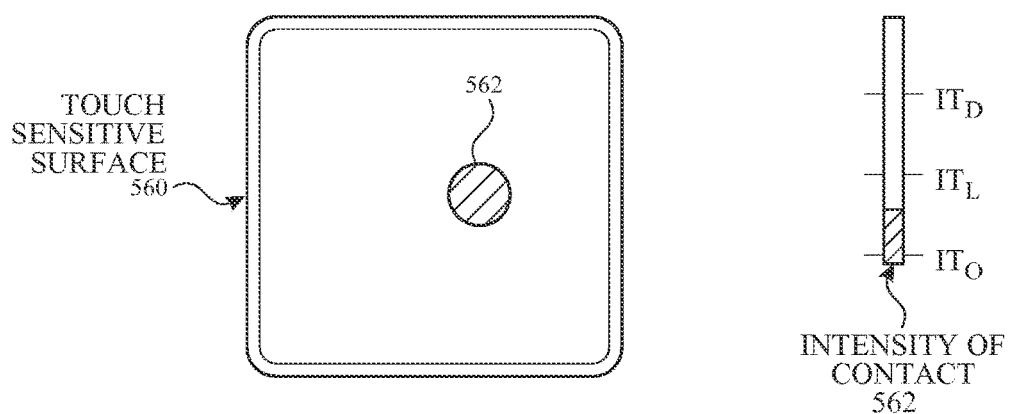
Figure 5F:
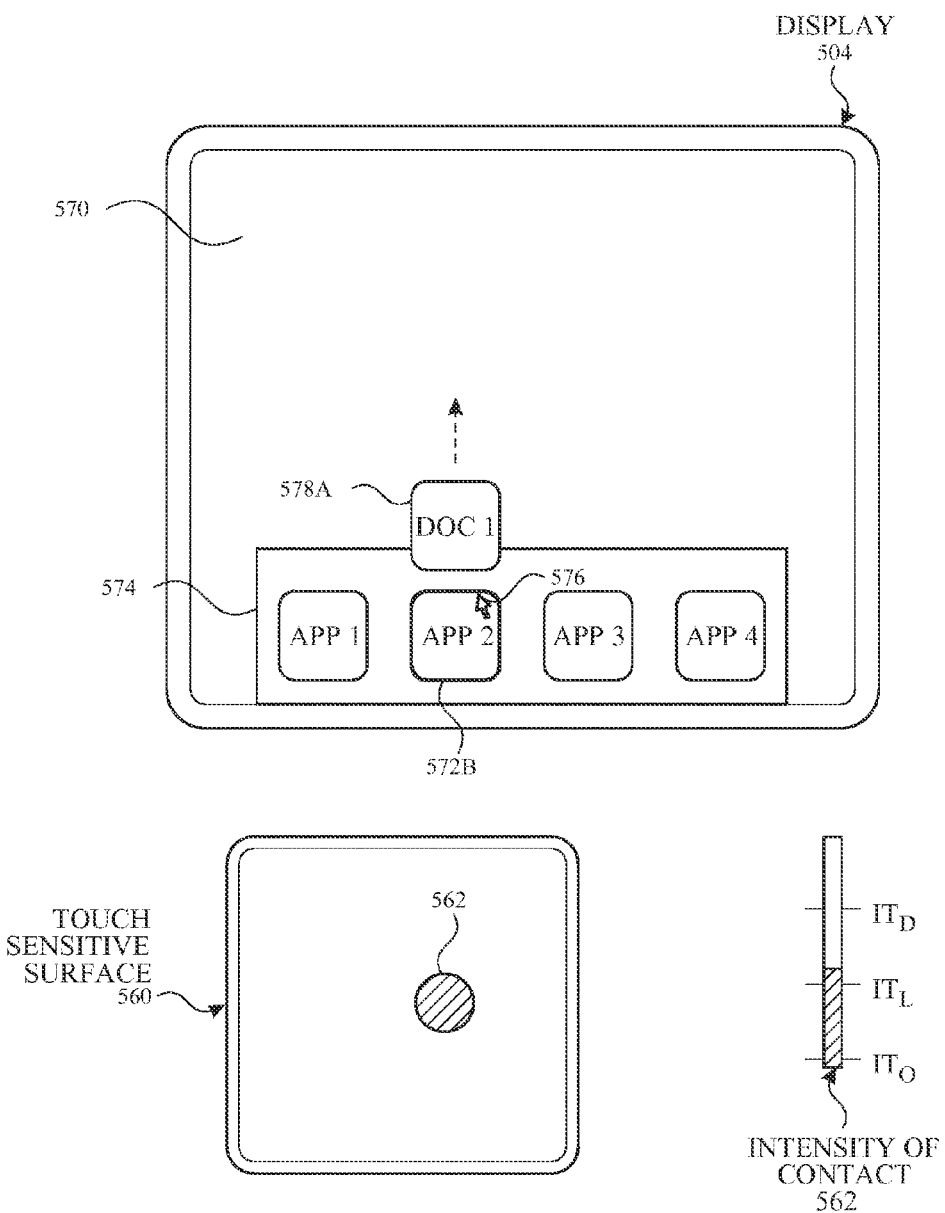
Figure 5G:
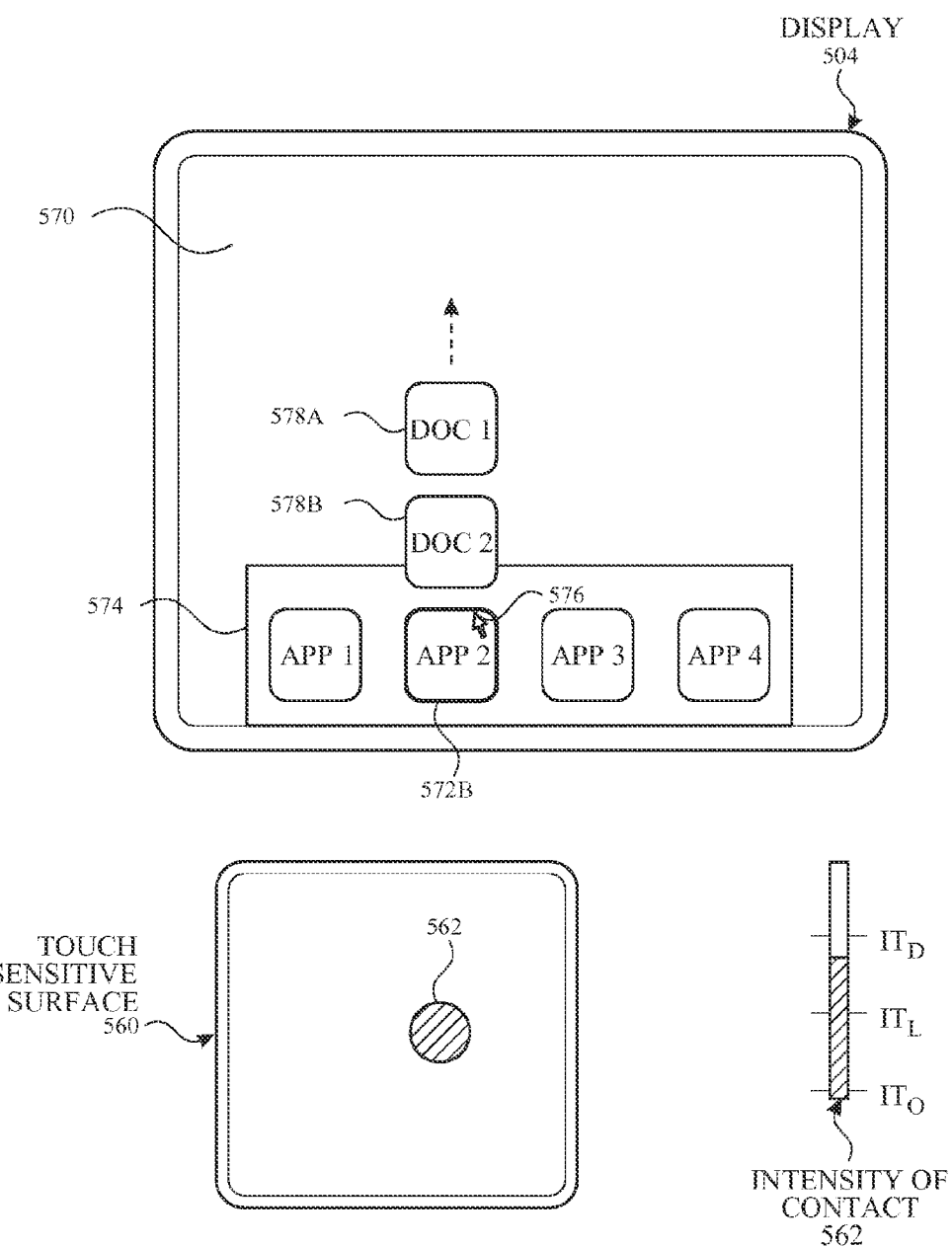
Figure 5H:
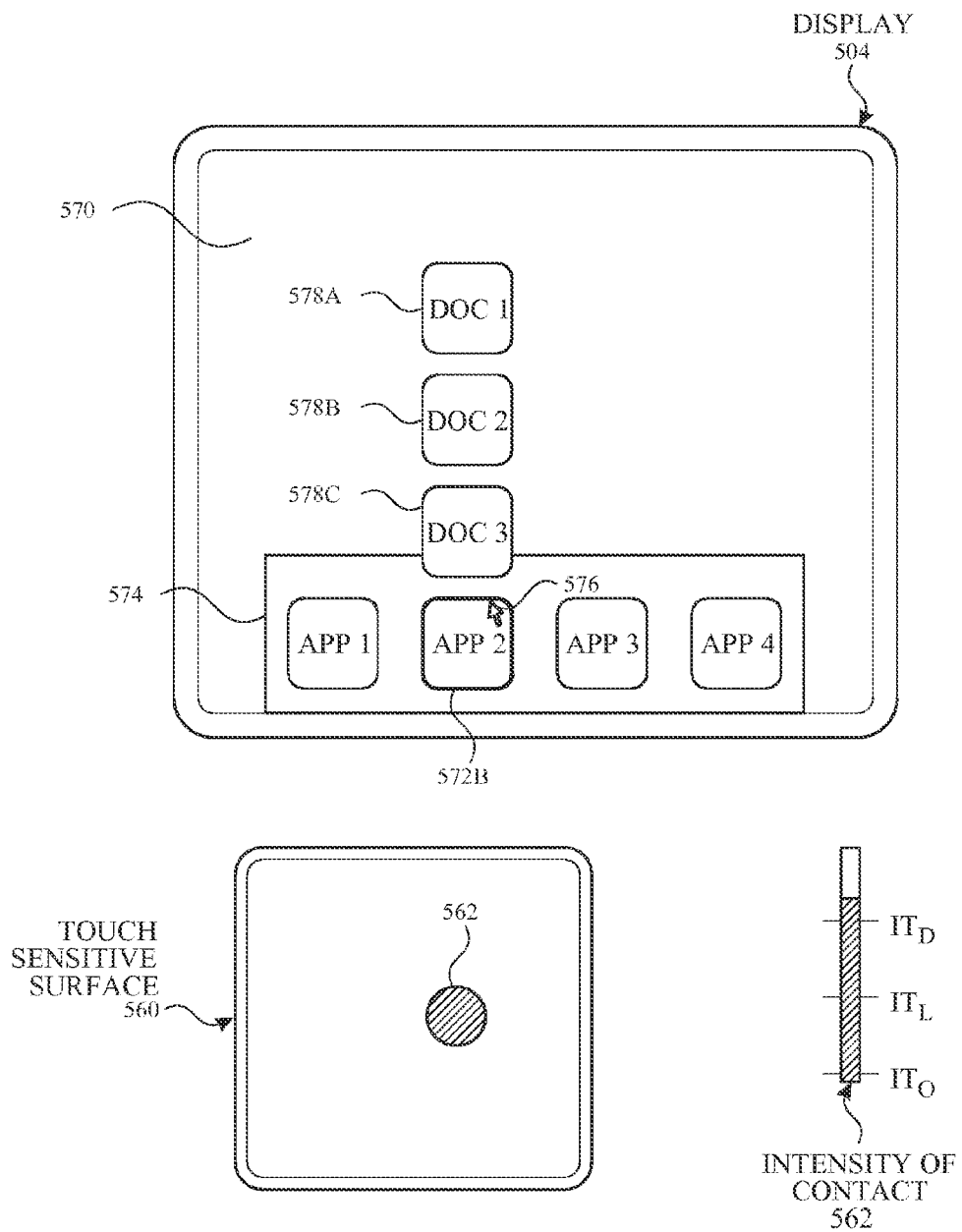

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on an electronic device, such as portable multifunction device 100, device 300, or device 500.

FIGS. 6A-6F illustrate example user interfaces for varying characteristic intensity thresholds, in accordance with some embodiments. The user interfaces in these figures may be used to illustrate the processes described below, including the processes in FIGS. 7A-7C and 8A-8C.

FIG. 6A illustrates an embodiment of an electronic device 600 configured to process input according to a first activity state 608 in one aspect and a second activity state 610 in another aspect. In some embodiments, electronic device 600 may be the same as or similar to portable multifunction device 100 (FIG. 1A) and/or device 500 (FIGS. 5A-5B). Electronic device may include touch-sensitive display 602, which may be the same as or similar to touch-sensitive display 112 (FIG. 1A) and/or display 504 (FIG. 5B), which may include touch-sensitive component 522 (FIG. 5B) and, optionally, touch-intensity sensitive component 524 (FIG. 5B). Touch-sensitive display 600 may include a GUI, which may display, among other objects and/or graphical elements, one or more affordances.

For example, electronic device 600 including touch-sensitive display 602 may be carried or operated by a user engaging in a particular activity. As such, as a user engages in a particular activity, the electronic device 600 may correspondingly be in a given activity state. In some embodiments, an activity state may be a movement condition of or experienced by electronic device 600. An activity state may include, but not be limited to, a user sitting/stationary, walking, running, swimming, and/or any type of activity that may result in a user touch/contact having a varying input intensity level.

In accordance with some embodiments, various sensors and software/hardware components and/or modules may be configured to provide one or more indications of an activity state. For example, electronic device 600 may be configured to determine an activity state based at least in part on one or more data selected from the group consisting of: accelerometer data, global positioning system data, wireless communication data, heart rate sensor data, and gyroscope data. In some embodiments, GPS module 135 (FIG. 1A) and/or GPS sensor 536 (FIG. 5B) may determine and/or provide global positioning data. Further, accelerometer 168 (FIG. 1A) and/or accelerometer 534 (FIG. 5B) may determine and/or provide accelerometer data. RF circuitry 108 (FIG. 1A) and/or communication unit 530 (FIG. 5B) may determine and/or provide wireless communication data. Heart rate sensor 542 (FIG. 5A) may determine and/or provide heart rate sensor data. Gyroscope 536 (FIG. 5B) may determine and/or provide gyroscope data.

In accordance with some embodiments, electronic device 600 may initially be configured to determine whether an input on the touch-sensitive display 602 meets or exceeds a first characteristic intensity threshold 614 based on a determination that the electronic device 600 is in a first activity state 608. Accordingly, electronic device 600 may, via touch-sensitive display 602, be configured to receive or otherwise detect an input based on a touch or contact, for example, by finger 606 during the first activity state 608. Electronic device 600 may also determine an input intensity of the input (e.g., touch/contact by finger 606).

Specifically, electronic device may receive an input corresponding to, for example, a touch/contact by user finger 606 on touch-sensitive display 602. Electronic device 600 may be configured to determine whether an input intensity of the input meets or exceeds a first characteristic intensity threshold 614 in response to receiving the input and in accordance with a determination that the electronic device 600 is in a first activity state 608. Electronic device 600 may be configured to perform an application process (e.g., associated with an affordance) in accordance with a determination that the input intensity of the input meets or exceeds the first characteristic intensity threshold 614. Electronic device 600 may be configured to perform a second application process (e.g., a process not associated with a displayed affordance) and forgo performance of the application process based on a determination that the electronic device 600 is in the first activity state 608 and a determination that the input intensity of the 608 does not meet or exceed the first characteristic intensity threshold 614.

In some embodiments, an entirety of the touch-sensitive display 602 may be configured or otherwise responsive to the first characteristic intensity threshold 614 or the second characteristic intensity threshold 616. In other embodiments, only a portion of the touch-sensitive display 602 may be configured according to a first characteristic intensity threshold 614, while another or the remaining portion of the touch-sensitive display 602 may be configured according to a second characteristic intensity threshold 616, as described further with respect to FIG. 6E.

Electronic device 600 may adjust to a second characteristic intensity threshold 616 based on a determination that the electronic device 600 is in a second activity state 610. In some embodiments, the second characteristic intensity threshold 616 may be greater than the first characteristic intensity threshold 614. In such embodiment, the first activity state 608 may be indicative of a stationary user and the second activity state 610 may be indicative of a user walking. In these embodiments, employing a higher characteristic intensity threshold during an activity state where the user's input's may be more imprecise due to user movement (e.g., walking) may partial or completely address unintended input pressure. In other embodiments, the second characteristic intensity threshold 616 may be less than the first characteristic intensity threshold 614. In such embodiment, for instance, the first activity state 608 may be indicative of a user walking and the second activity state 610 may be indicative of a stationary user.

As such, an adjustment to/from the characteristic intensity threshold 616 may adjust a corresponding and requisite input intensity that may be needed to trigger performance of an application process. For example, electronic device 600 may be configured to determine whether the input intensity of the touch/contact 604 meets or exceeds a second characteristic intensity threshold 616 different from the first characteristic intensity threshold. 614 in response to receiving the touch/contact 604 and in accordance with a determination that the electronic device 600 is in a second activity state 616. Accordingly, electronic device 600 may perform the application process in accordance with a determination that the input intensity of the input meets or exceeds the second characteristic intensity threshold 616.

Further, electronic device 600 may perform the second application process and forgoing performance of the application process in accordance a determination that the electronic device 600 is in the second activity state 610 and a determination that the input intensity of the input (e.g., touch/contact by user finger 606) does not meet or exceed the second characteristic intensity threshold 616. For instance, the second application process may be a process triggered by an input (e.g., touch) having a lower input intensity relative to an input (e.g., hard press) triggering the application process. In some embodiments, the second application process causes display of a contextual menu or is a process that is not associated with an affordance at the input location. One or both of the first application process and the second application may be associated with a respective affordance or a display object.

In accordance with some embodiments, the first characteristic intensity threshold 614 may be associated with the first activity state 608 and corresponds to an input intensity that may trigger a process or operation. In accordance with some embodiments, the second characteristic intensity threshold 616 may be associated with the second activity state 610 and corresponds to an input intensity that may trigger a process or operation. In accordance with some embodiments, the application process and the second application process may be a process associated with a respective affordance and triggered by a sufficiently intense input (e.g., touch/contact) on the touch-sensitive display 602.

Figure 6B:
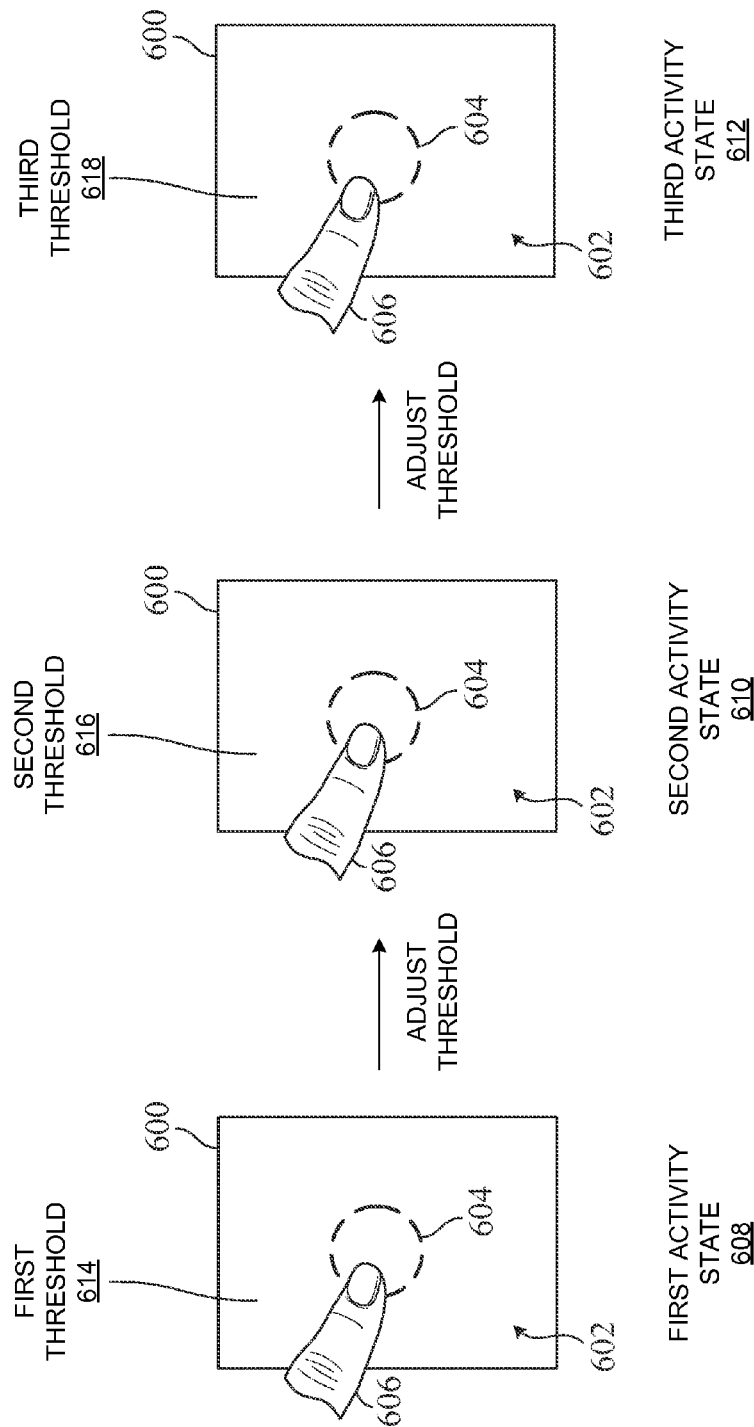

FIG. 6B illustrates a further example of electronic device 600 configured to receive one or more inputs during various activity states. Specifically, electronic device 600 may be configured according to a first activity state 608 and a second activity state 610, as described above, as well as a third activity state 612. For example, electronic device 600 may initially be configured according to the first activity state 608, where an input intensity of an input 604 (e.g., touch/contact 606) may be compared to a first characteristic intensity threshold 614. However, a user of the electronic device 600 may engage in an activity triggering an adjustment (e.g., increase/decrease) in the characteristic intensity threshold.

For example, the user of the electronic device 600 may transition from first activity state 608 (e.g., user sitting) to second activity state 610 (e.g., user walking). As such, electronic device 600 may detect or otherwise determine such a change in activity, and may be configured according to second characteristic intensity threshold 616 associated with second activity state 610. Likewise, the user may again engage in an activity that triggers or otherwise causes an adjustment of the characteristic intensity threshold. For instance, the user may transition from the second activity state 610 (e.g., user walking) to third activity state 612 (e.g., user running). Accordingly, the electronic device 600 may be configured or may operate according to third characteristic intensity threshold 618. In accordance with some embodiments, third characteristic intensity threshold 618 may be greater than the second characteristic intensity threshold 616 and the first characteristic intensity threshold 614.

Figure 6C:
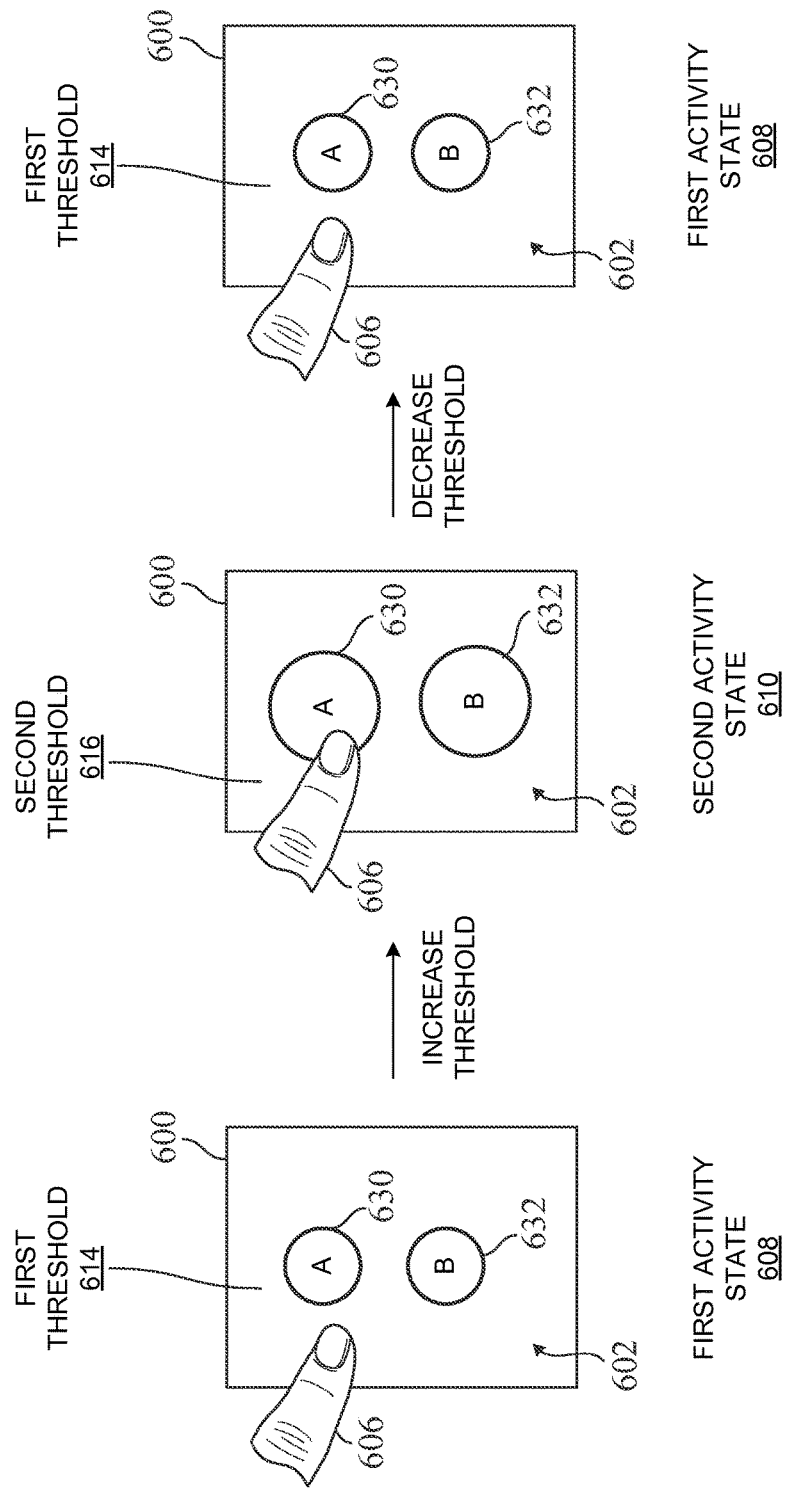

FIG. 6C illustrates another embodiment of the electronic device 600 configured to adjust and display on the touch-sensitive display 602 varying affordance sizes in accordance or otherwise associated with an activity state. For example, electronic device 600 may initially display, on touch-sensitive display 602, first affordance 630 having a first size and second affordance 632 having a first size. The electronic device 600 may determine or otherwise detect a change from first activity state 608 to second activity 610. Upon such determination, electronic device 600 may be configured or operate according to second activity state 610 (e.g., according to second characteristic intensity threshold).

In particular, electronic device 600, via touch-sensitive display 602, may be responsive to one or more inputs (e.g., via finger 606) according to a second characteristic intensity threshold 616 higher than a first characteristic intensity threshold 614. Additionally, in some embodiment, and in order to aid the user during periods of increased activity (e.g., walking), electronic device 600 may display on touch-sensitive display 602 the first affordance 630 having a second size larger than the first size, and a second affordance having a second size larger than the first size. In other embodiments, electronic device 600 may adjust a size of a subset of affordances on the touch-sensitive display 602. For example, a size of first affordance 630 may be adjusted from a first size to a second size larger than the first size when transitioning from first activity state 608 to the second activity 610. However, the second affordance 632 may maintain the first size even when electronic device 600 is configured or operates according to second characteristic intensity threshold 616. In such embodiments, the change in size of the affordance may compensate for imprecision in user input, due to user activity.

In additional embodiments, electronic device 600 may return to the first characteristic intensity threshold 614 in accordance with a determination that the electronic device 600 is in the first activity state 608. That is, based on a determination that electronic device 600 has transitioned from a second activity state 610 (e.g., walking) to a first activity state 608 (e.g., stationary), electronic device 600 may be configured according to the first characteristic intensity threshold. Accordingly, the first affordance 630 may adjust to the second (larger) size to the first size, and the second affordance may also adjust from the second (larger) size to the first size. In some embodiments, electronic device 600 may adjust or readjust a size of a subset (e.g., only first affordance 630) of affordances on the touch-sensitive display 602.

FIG. 6D illustrates an example object interaction on the touch-sensitive display 602 of the electronic device 600. In particular, electronic device 600 may be configured according to the first activity state 608. As such, touch-sensitive display 602 of electronic device 600 may be configured or otherwise responsive to a first characteristic intensity threshold 614. Touch-sensitive display 602 may display, in a non-limiting aspect, message 642. In one embodiment at 650A, a user, via finger 606 may touch/contact touch-sensitive display 602 such that touch-sensitive display 602 detects a first input intensity 620. That is, the touch/contact, which may be a downward directional swipe on the touch-sensitive display 602 area displaying the message 642, may attempt/desire to scroll the message 642. As such, electronic device 600 may determine whether first input intensity 620 meets or exceeds the first characteristic intensity threshold 614 associated with the first activity state 608. Electronic device 600 may be configured to display, on touch-sensitive display 602, a scrolling of the message 642 in accordance with a determination that the first input intensity 620 does not meet or exceed the first characteristic intensity threshold 614.

In a further embodiment at 650B, a user of the electronic device 600 may desire to trigger an alternate application process based on a touch/contact of the touch-sensitive display 602 area displaying the message 642. For example, the user may desire to have displayed an options 640 screen associated with the message 642. In this case, the touch/contact via, for example, a user's finger 606 may have a second input intensity 622 higher than the first input intensity 620. Accordingly, electronic device 600 may determine whether second input intensity 622 meets or exceeds the first characteristic intensity threshold 614 associated with the first activity state 608. Electronic device 600 may be configured to display, on touch-sensitive display 602, an options menu associated with the message 642 in accordance with a determination that the first input intensity 620 meets or exceeds the first characteristic intensity threshold 614. In accordance with some embodiments, electronic device 600 may be configured to operate in the second activity state 610 in the same or similar manner as described herein with respect to the first activity state 608, based on a second characteristic intensity threshold 616, instead of the first characteristic intensity threshold 614, as shown in 650C and 650D.

FIG. 6E illustrates an embodiment of an electronic device 600 receiving an input (e.g., touch/contact via finger 606) on one of an affordance (e.g., send affordance 624) or an area beyond the affordance. Specifically, the electronic device 600 may, in some instances, be configured according to two or more concurrent characteristic intensity thresholds. For example, electronic device 600 may initially be configured in accordance with a determination of a first activity state 608 (e.g., user walking). Accordingly, electronic device 600 may configure a first portion of touch-sensitive display 602 according to first characteristic intensity threshold 614, and a second and distinct portion of the touch-sensitive display 602 with second characteristic intensity threshold 616.

The send affordance 624 may be associated with and thus responsive to, the second characteristic intensity threshold 616. In some embodiments, the second characteristic intensity threshold 616 may be higher or greater than the first characteristic intensity threshold 614. In other embodiments, the second characteristic intensity threshold 616 may be less than the first characteristic intensity threshold 614. As such, a first input intensity of a first input (e.g., touch/contact by finger 606) on send affordance 624 (during first activity state 608) that meets or exceeds second characteristic intensity threshold 616 may cause electronic device to perform a first application process associated with the send affordance 624. On the other hand, the first input intensity of the first input (e.g., touch/contact by finger 606) on the send affordance 624 that does not meet or exceed second characteristic intensity threshold 616 may cause electronic device to forgo performance of the first application process perform a second application process associated with the send affordance 624 (e.g., send message).

Further, the electronic device 600 may be configured according to a determination of a second activity state (e.g., a user running). In particular, electronic device 600 may configure a first portion of touch-sensitive display 602 according to fourth characteristic intensity threshold 625, and a second and distinct portion of the touch-sensitive display 602 with fifth characteristic intensity threshold 628. In some embodiments, the fourth characteristic intensity threshold 626 may be higher or greater than the fifth characteristic intensity threshold 628. In other embodiments, the fourth characteristic intensity threshold 626 may be less than the fifth characteristic intensity threshold 628.

In this case, electronic device 600 may receive a second input (e.g., touch/contact via finger 606) having a second input intensity on a portion of the touch-sensitive display 602 that does not include the send affordance 624. Electronic device 600 may determine whether the second input intensity of the second input meets or exceeds a fifth characteristic intensity threshold greater than or equal to the first characteristic intensity threshold and lower than the second characteristic intensity threshold 616 and the fourth characteristic intensity threshold 626. Electronic device 600 may perform a first application process associated with the area of the touch-sensitive display 602 receiving the second input in accordance with a determination that the second input intensity of the input meets or exceeds the fifth characteristic intensity threshold 628. Additionally, electronic device 600 may perform a second application process or forgo any action in accordance with a determination that the second input intensity of the input does not meet or exceed the fifth characteristic intensity threshold 628. In some embodiments, a device as depicted in FIG. 6E may address instances of inadvertent or unintentional touches/contacts on some affordances during periods of increased activity (e.g., walking/running) by increasing the characteristic intensity threshold of the area forming the affordance, and hence, increasing the input intensity that may be needed to detect an input and subsequently trigger the application process associated with the affordance.

Figure 6F:
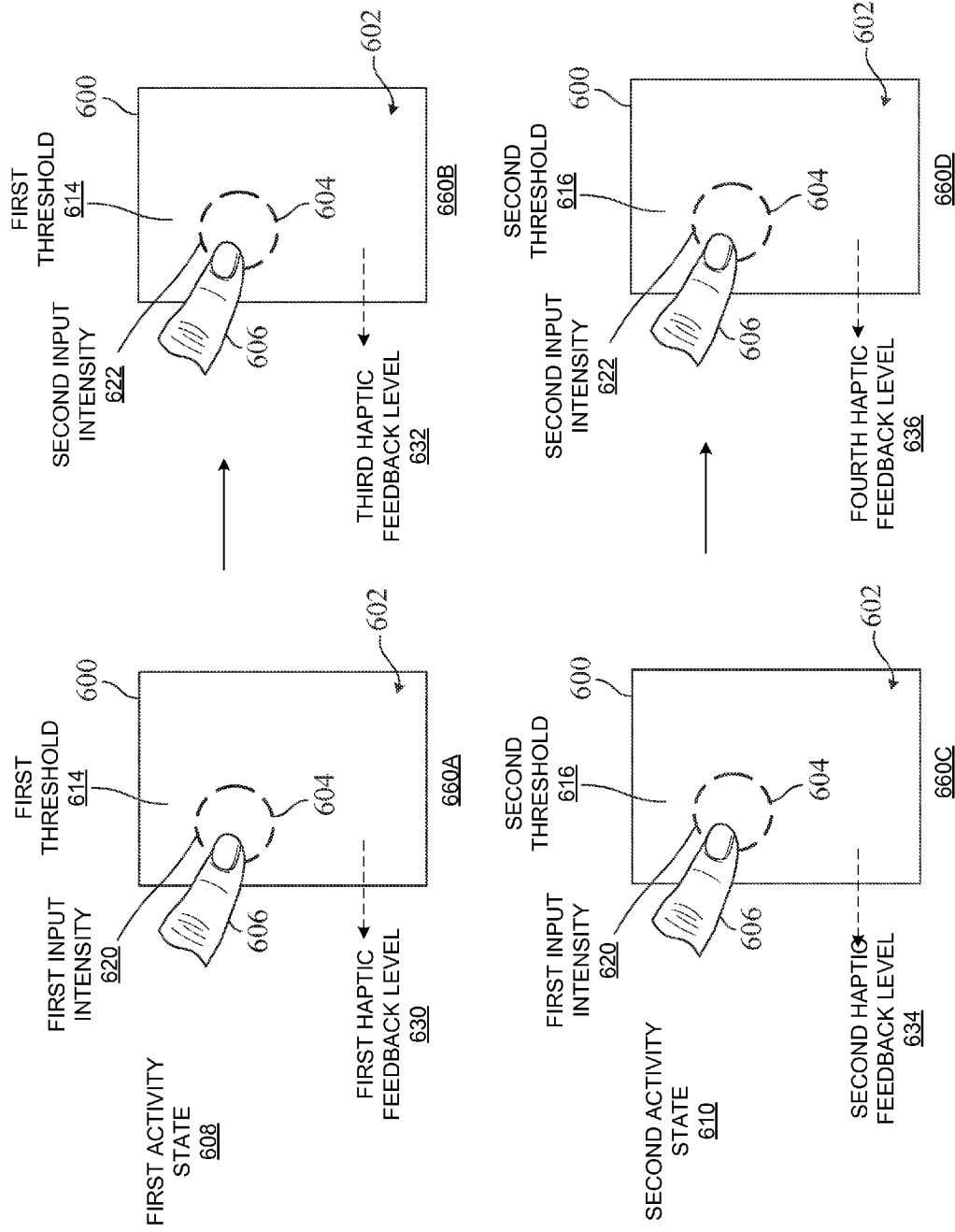

FIG. 6F illustrates an electronic device 600 providing a varying feedback level based on activity state. For example, electronic device 600 may display, on the touch-sensitive display 602, a GUI, and may be configured to operate in a first activity state 608. Accordingly, electronic device 600 may receive an input 604 representing a touch/contact with the touch-sensitive display 602 by user finger 606. In some embodiments, input 604 may have a first input intensity 620. Electronic device 600 may be configured to determine whether the input intensity of the input meets or exceeds a first characteristic intensity threshold 614 in response to receiving the input 604 and in accordance with a determination that the electronic device 600 is in a first activity state 608. Further, electronic device 600 may provide a haptic feedback of a first feedback level 630 at 660A in accordance with a determination that the first input intensity of the input meets or exceeds the first characteristic intensity threshold 614. Electronic device 600 may further provide a haptic feedback of a third feedback level 632 at 660B different from the first feedback level 630 in accordance with a determination that the first input intensity of the input does not meet or exceed the first characteristic intensity threshold 614. For example, a second input may be received having a second input intensity 622 different from the input having the first input intensity 620. In some embodiments, as a user may be less capable of perceiving haptic feedback while active, a device as depicted in FIG. 6E may increase the haptic feedback to a level perceptible by the user in a corresponding activity state.

Electronic device 600 may also determine whether the first input intensity 620 of the input 604 meets or exceeds a second characteristic intensity threshold 616 higher than the first characteristic intensity threshold 614 in response to receiving the input 604 and in accordance with a determination that the electronic device 600 is in a second activity state 610. Accordingly, electronic device 600 may provide a haptic feedback of a second feedback level at 660C 634 higher than the first feedback level 630 in accordance with a determination that the first input intensity 620 of the input meets or exceeds the second characteristic intensity threshold 616. In a further embodiment, electronic device 600 may provide a haptic feedback of a fourth feedback level 636 at 660D different from the second feedback level 634 and higher than the third feedback level 632 in accordance with a determination that the first input intensity 620 of the input 604 does not meet or exceed the second characteristic intensity threshold 616. For example, a second input may be received having a second input intensity 622 different from the input having the first input intensity 620.

FIGS. 7A and 7B are flow diagrams illustrating a method for performing an application process based on a determination of an activity state and a comparing a corresponding characteristic intensity threshold to an input intensity of a user input, in accordance with some embodiments. Method 700 may be performed at a device (e.g., 100, 300, and 500) with a touch-sensitive display. Some operations in method 700 may be combined, the order of some operations may be changed, and some operations may be omitted.

In some embodiments, the touch-sensitive surface (e.g., 112, 355, and 504) may be configured to detect intensity of touch contacts. In some embodiments, method 700 may be performed at an electronic device with a touch-sensitive surface/display (e.g., 112, 355, 504) to perform an application process based on a determination of an activity state and a comparison of a corresponding characteristic intensity threshold to an input intensity of a user input. Example devices that may perform method 700 include devices 100, 300, and 500 (FIGS. 1A, 3, and 5A).

As described below, method 700 provides an intuitive way for interacting with an electronic device by performing one or more application processes based on an activity state determination and a comparison of a corresponding characteristic intensity threshold to an input intensity of an input, for instance, during the activity state. The method reduces the physical and/or cognitive burden on a user who may touch/contact the touch-sensitive surface/display during various activities, thereby creating a more efficient human-machine interface.

At block 702, method 700 may display a GUI. At block 704, method 700 may receive an input representing a contact with the GUI, the input having an input intensity. At block 706, method 700 may, in response to receiving the input and in accordance with a determination that the electronic device is in a first activity state, determine whether the input intensity of the input meets or exceeds a first characteristic intensity threshold. At block 708, method 700 may, in accordance with a determination that the input intensity of the input meets or exceeds the first characteristic intensity threshold, perform an application process.

However, method 700 may proceed to block 718 (FIG. 7B) where in accordance with a determination that the electronic device is in the first activity state and a determination that the input intensity of the input does not meet or exceed the first characteristic intensity threshold, perform the second application process and forgo performance of the first application process.

At block 712, method 700 may, in response to receiving the input and in accordance with a determination that the electronic device is in a second activity state, determine whether the input intensity of the input meets or exceeds a first characteristic intensity threshold higher than the first characteristic intensity threshold. At block 714, method 700 may, in accordance with a determination that the input intensity of the input meets or exceeds the second characteristic intensity threshold, perform an application process.

However, method 700 may proceed to block 720 (FIG. 7B) where in accordance with a determination that the electronic device is in the second activity state and a determination that the input intensity of the input does not meet or exceed the first characteristic intensity threshold, perform the second application process and forgo performance of the first application process.

In accordance with some embodiments, the determination that the electronic device is in the first activity state and the determination that the electronic device is in the second activity state are each independently based at least in part on one or more data selected from the group consisting of: accelerometer data, global positioning system data, wireless communication data, heart rate sensor data, and gyroscope data.

In accordance with some embodiments, in response to receiving the input and in accordance with a determination that the input represents a contact on a portion of the GUI that does not include the affordance and a determination that the electronic device is in the second activity state, determining whether the second input intensity of the input meets or exceeds a third characteristic intensity threshold greater than or equal to the first characteristic intensity threshold and lower than the second characteristic intensity threshold.

Further, in accordance with some embodiments, in accordance with a determination that the input intensity of the input does not meet or exceed the third characteristic intensity threshold, forgoing action.

In accordance with some embodiments, the determination that the electronic device is in the first activity state includes a determination that a user of the electronic device is stationary or walking.

In accordance with some embodiments, the determination that the electronic device is in the second activity state includes a determination that a user of the electronic device is walking or running.

In accordance with some embodiments, in accordance with a determination that the electronic device is in the first activity state and a determination that the input intensity of the input meets or exceeds the first characteristic intensity threshold, providing haptic feedback of a first feedback level; in accordance with a determination that the electronic device is in the second activity state and a determination that the input intensity of the input meets or exceeds the second characteristic intensity threshold, providing haptic feedback of a second feedback level greater than the first feedback level.

Referring to FIG. 7C, a flow diagram illustrates a method 730 for performing an application process based on a determination of an activity state and a comparing a corresponding characteristic intensity threshold to an input intensity of a user input, in accordance with some embodiments. Method 730 may be performed at a device (e.g., 100, 300, and 500) with a touch-sensitive display. Some operations in method 730 may be combined, the order of some operations may be changed, and some operations may be omitted.

In some embodiments, the touch-sensitive surface (e.g., 112, 355, and 504) may be configured to detect intensity of touch contacts. In some embodiments, method 730 may be performed at an electronic device with a touch-sensitive surface/display (e.g., 112, 355, 504) to perform an application process based on a determination of an activity state and a comparison of a corresponding characteristic intensity threshold to an input intensity of a user input. Example devices that may perform method 700 include devices 100, 300, and 500 (FIGS. 1A, 3, and 5A).

As described below, method 730 provides an intuitive way for interacting with an electronic device by performing one or more application processes based on an activity state determination and a comparison of a corresponding characteristic intensity threshold to an input intensity of an input, for instance, during the activity state. The method reduces the physical and/or cognitive burden on a user who may touch/contact the touch-sensitive surface/display during various activities, thereby creating a more efficient human-machine interface.

At block 740, method 730 may display a GUI. At block 742, method 730 may receive an input representing a contact with the GUI, the input having an input intensity. At block 744, method 730 may determine whether the electronic device is in a first activity state or a second activity state. In some embodiments, a determination that the electronic device is in the first activity state includes a determination that a user of the electronic device is stationary or walking. In other embodiments, a determination that the electronic device is in the second activity state includes a determination that a user of the electronic device is walking or running. As will be understood, first and second activities levels can be generalized to any activity, and the activity state can be based on predetermined or automatically adjusted thresholds on the outputs of one or more sensors, such as accelerometers, gyroscopes, pressure sensors, GPS receivers, Wi-Fi receivers, etc.

Method 730 may proceed to block 746 based on a determination that electronic device is in a first activity state and may determine whether the input intensity of the input meets or exceeds a first characteristic intensity threshold. At block 748, method 730 may perform an application process in accordance with a determination that the input intensity of the input meets or exceeds the first characteristic intensity threshold. Alternatively, method 730 may proceed to 750 and perform the second application process and forgo performance of the first application process in accordance with a determination that the input intensity of the input does not meet or exceed the first characteristic intensity threshold.

However, method 730 may proceed to block 752 based on a determination that the electronic device is in a second activity state and may determine whether the input intensity of the input meets or exceeds a second characteristic intensity threshold. At block 754, method 730 may perform an application process in accordance with a determination that the input intensity of the input meets or exceeds the first characteristic intensity threshold. Alternatively, method 730 may proceed to 756 and perform the second application process and forgo performance of the first application process in accordance with a determination that the input intensity of the input does not meet or exceed the first characteristic intensity threshold.

Note that details of the processes described above with respect to methods 700 (e.g., FIGS. 7A-7B) and 730 (FIG. 7C) are also applicable in an analogous manner to the methods described below. For example, methods 800 (FIG. 8A-8B) and 830 (FIG. 8C) may include one or more of the characteristics of the various methods described above with reference to method 700. For brevity, these details are not repeated below.

FIGS. 8A and 8B are flow diagrams illustrating a method for providing different haptic feedback levels at an electronic device in accordance with some embodiments. Method 800 may be performed at a device (e.g., 100, 300, and 500) with a touch-sensitive display. Some operations in method 800 may be combined, the order of some operations may be changed, and some operations may be omitted.

In some embodiments, the touch-sensitive surface (e.g., 112, 355, and 504) may be configured to detect intensity of touch contacts. In some embodiments, method 800 may be performed at an electronic device with a touch-sensitive surface/display (e.g., 112, 355, 504) to provide haptic feedback having a haptic feedback level based on a determination of an activity state and a comparison of a corresponding characteristic intensity threshold to an input intensity of a user input. Example devices that may perform method 800 include devices 100, 300, and 500 (FIGS. 1A, 3, and 5A).

As described below, method 800 provides an intuitive way for interacting with an electronic device by providing a haptic feedback having a haptic feedback level based on an activity state determination and a comparison of a corresponding characteristic intensity threshold to an input intensity of an input, for instance, during the activity state. The method reduces the physical and/or cognitive burden on a user who may touch/contact the touch-sensitive surface/display during various activities, thereby creating a more efficient human-machine interface.

At block 802, method 800 may display a GUI. At block 804, method 800 may receive an input representing a contact with the GUI, the input having an input intensity. At block 806, method 800 may, in response to receiving the input and in accordance with a determination that the electronic device is in a first activity state, determine whether the input intensity of the input meets or exceeds a first characteristic intensity threshold. At block 808, method 800 may, in accordance with a determination that the input intensity of the input meets or exceeds the first characteristic intensity threshold, providing a haptic feedback of a first feedback level.

However, method 800 may proceed to block 818 where, in accordance with a determination that the input intensity of the input does not meet or exceed the first characteristic intensity threshold, provide a haptic feedback of a third feedback level different from the first feedback level.

At block 812, method 800 may, in response to receiving the input and in accordance with a determination that the electronic device is in a second activity state, determine whether the input intensity of the input meets or exceeds a first characteristic intensity threshold higher than the first characteristic intensity threshold. At block 814, method 800 may, in accordance with a determination that the input intensity of the input meets or exceeds the second characteristic intensity threshold, providing a haptic feedback of a second feedback level higher than the first feedback level.

However, method 800 may proceed to block 820 where, in accordance with a determination that the input intensity of the input does not meet or exceed the first characteristic intensity threshold, provide a haptic feedback of a fourth feedback level different from the second feedback level and higher than the third feedback level.

In accordance with some embodiments, the determination that the electronic device is in the second activity state is based at least in part on one or more data selected from the group consisting of: accelerometer data, global positioning system data, wireless communication data, heart rate sensor data, and gyroscope data.

Referring to FIG. 8C, a flow diagram illustrates a method 730 for providing different haptic feedback levels at an electronic device in accordance with some embodiments. Method 830 may be performed at a device (e.g., 100, 300, and 500) with a touch-sensitive display. Some operations in method 830 may be combined, the order of some operations may be changed, and some operations may be omitted.

In some embodiments, the touch-sensitive surface (e.g., 112, 355, and 504) may be configured to detect intensity of touch contacts. In some embodiments, method 830 may be performed at an electronic device with a touch-sensitive surface/display (e.g., 112, 355, 504) to provide haptic feedback having a haptic feedback level based on a determination of an activity state and a comparison of a corresponding characteristic intensity threshold to an input intensity of a user input. Example devices that may perform method 830 include devices 100, 300, and 500 (FIGS. 1A, 3, and 5A).

As described below, method 800 provides an intuitive way for interacting with an electronic device by providing a haptic feedback having a haptic feedback level based on an activity state determination and a comparison of a corresponding characteristic intensity threshold to an input intensity of an input, for instance, during the activity state. The method reduces the physical and/or cognitive burden on a user who may touch/contact the touch-sensitive surface/display during various activities, thereby creating a more efficient human-machine interface.

At block 840, method 830 may display a GUI. At block 842, method 830 may receive an input representing a contact with the GUI, the input having an input intensity. At block 844, method 830 may determine whether the electronic device is in a first activity state or a second activity state. In some embodiments, a determination that the electronic device is in the first activity state includes a determination that a user of the electronic device is stationary or walking. In other embodiments, a determination that the electronic device is in the second activity state includes a determination that a user of the electronic device is walking or running.

Method 830 may proceed to block 846 based on a determination that electronic device is in a first activity state and may determine whether the input intensity of the input meets or exceeds a first characteristic intensity threshold. At block 848, method 830 may provide a haptic feedback of a first feedback level in accordance with a determination that the input intensity of the input meets or exceeds the first characteristic intensity threshold. Alternatively, method 830 may proceed to 850 and provide a haptic feedback of a second haptic feedback level in accordance with a determination that the input intensity of the input does not meet or exceed the first characteristic intensity threshold.

However, method 830 may proceed to block 852 based on a determination that the electronic device is in a second activity state and may determine whether the input intensity of the input meets or exceeds a second characteristic intensity threshold. At block 854, method 830 may provide a haptic feedback of a third feedback level higher than the first feedback level in accordance with a determination that the input meets or exceeds the first characteristic intensity threshold. Alternatively, method 830 may proceed to 856 and provide a haptic feedback of a fourth feedback level higher than the second feedback level in accordance with a determination that the input intensity of the input does not meet or exceed the first characteristic intensity threshold.

Figure 9:
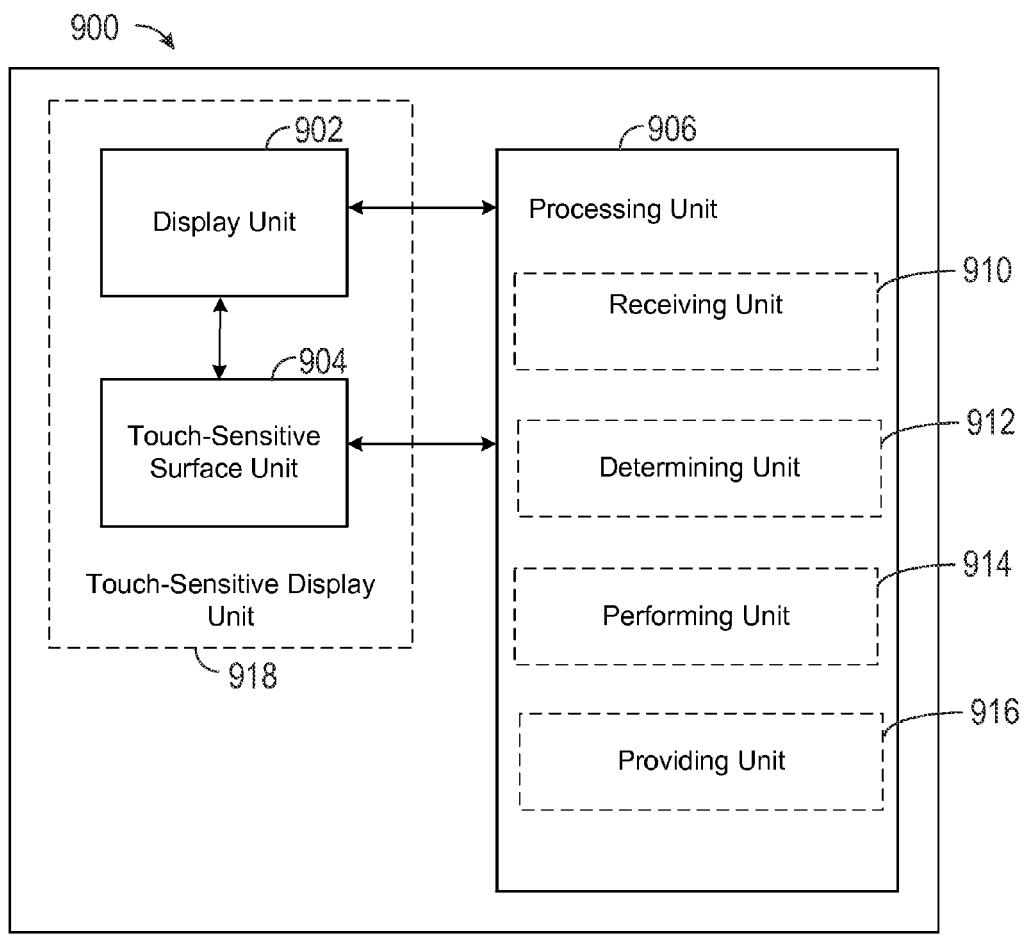
FIG. 9 illustrates a functional block diagram in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a touch-sensitive display unit 918 including a display unit 902 configured to display a graphic user interface, a touch-sensitive surface unit 904 configured to detect intensity of contacts, and a processing unit 906 coupled to the touch-sensitive display unit 918 (e.g., including display unit 902 and the touch-sensitive surface unit 904). In some embodiments, the processing unit 906 includes a receiving unit 910, a determining unit 912, a performing unit 914, and a providing unit 916.

The processing unit 906 is configured to: display, on the touch sensitive display unit (e.g., using touch-sensitive display unit 918), a graphical user interface (GUI); receive (e.g., using receiving unit 910) an input representing a contact with the GUI, the input having an input intensity; in response to receiving the input and in accordance with a determination that the electronic device is in a first activity state, determine (e.g., using determining unit 912) whether the input intensity of the input meets or exceeds a first characteristic intensity threshold; in accordance with a determination that the input intensity of the input meets or exceeds the first characteristic intensity threshold, perform (e.g., using performing unit 914) an application process; in response to receiving the input and in accordance with a determination that the electronic device is in a second activity state, determine (e.g., using determining unit 912) whether the input intensity of the input meets or exceeds a second characteristic intensity threshold higher than the first characteristic intensity threshold; and in accordance with a determination that the input intensity of the input meets or exceeds the second characteristic intensity threshold, perform (e.g., using performing unit 914) the application process.

In accordance with some embodiments, the GUI includes an affordance associated with a second application process, and wherein the input represents a contact with the affordance, the processing unit 906 is further configured to: in accordance with a determination that the electronic device is in the first activity state and a determination that the input intensity of the input does not meet or exceed the first characteristic intensity threshold, perform (e.g., using the performing unit 914) the second application process and forgo performance of the first application process; and in accordance with a determination that the electronic device is in the second activity state and a determination that the input intensity of the input does not meet or exceed the second characteristic intensity threshold, perform (e.g., using the performing unit 914) the second application process and forgo performance of the first application process.

In accordance with some embodiments, the determination that the electronic device is in the first activity state and the determination that the electronic device is in the second activity state are each independently based at least in part on one or more data selected from the group consisting of: accelerometer data, global positioning system data, wireless communication data, heart rate sensor data, and gyroscope data.

In accordance with some embodiments, the processing unit 906 is further configured to: in response to receiving the input and in accordance with a determination that the input represents a contact on a portion of the GUI that does not include the affordance and a determination that the electronic device is in the second activity state, determine (e.g., using determining unit 912) whether the second input intensity of the input meets or exceeds a third characteristic intensity threshold greater than or equal to the first characteristic intensity threshold and lower than the second characteristic intensity threshold.

In accordance with some embodiments, the processing unit 906 is further configured to in accordance with a determination that the input intensity of the input does not meet or exceed the third characteristic intensity threshold, forgoing action.

In accordance with some embodiments, the determination that the electronic device is in the first activity state includes a determination that a user of the electronic device is stationary or walking.

In accordance with some embodiments, the determination that the electronic device is in the second activity state includes a determination that a user of the electronic device is walking or running.

In accordance with some embodiments, the processing unit 906 is further configured to in accordance with a determination that the electronic device is in the first activity state and a determination that the input intensity of the input meets or exceeds the first characteristic intensity threshold, provide (e.g., using providing unit 916) haptic feedback of a first feedback level; in accordance with a determination that the electronic device is in the second activity state and a determination that the input intensity of the input meets or exceeds the second characteristic intensity threshold, provide (e.g., using providing unit 916) haptic feedback of a second feedback level greater than the first feedback level.

The operations described above with reference to FIG. 9 are, optionally, implemented by components depicted in FIGS. 1A-1B or FIG. 9. For example, displaying operation 702 (FIG. 7A), receiving operation 704 (FIG. 7A), determining operation 806 (FIG. 7A), and performing operation 808 (FIG. 7A) may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 10:
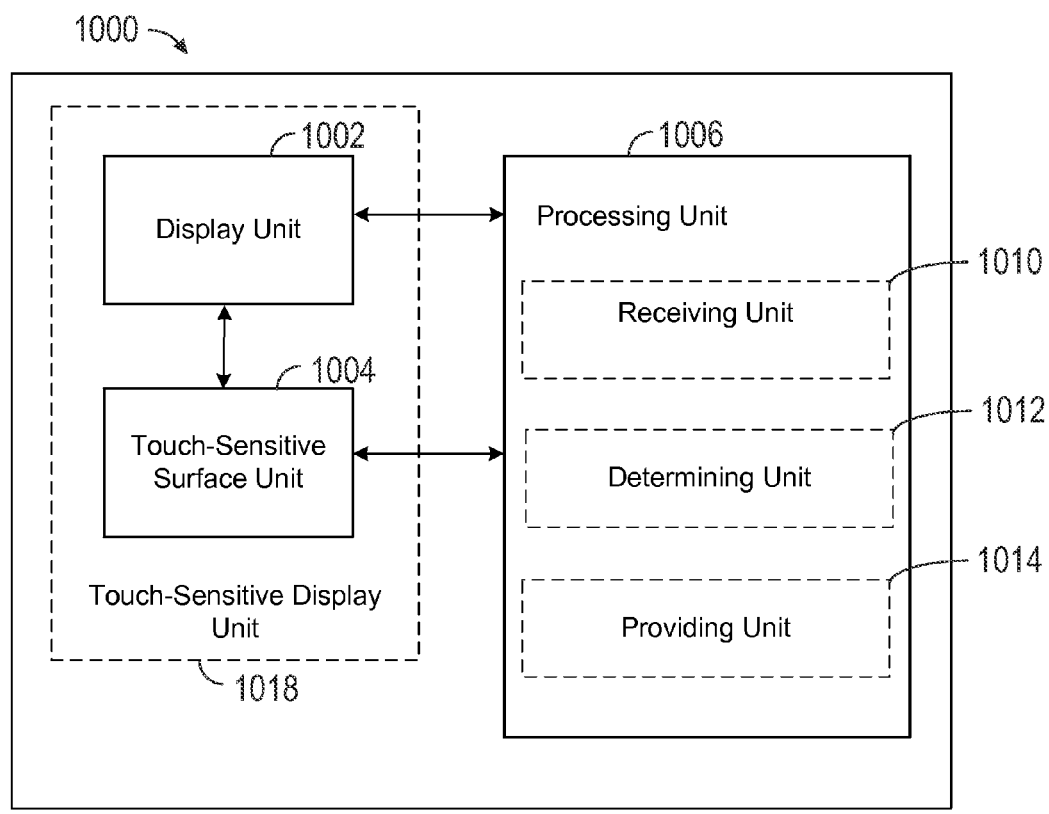
FIG. 10 illustrates a functional block diagram in accordance with some embodiments.

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a touch-sensitive display unit 1018 including a display unit 1002 configured to display a graphic user interface, a touch-sensitive surface unit 1004 configured to detect intensity of contacts, and a processing unit 1006 coupled to the touch-sensitive display unit 1018 (e.g., including display unit 1002 and the touch-sensitive surface unit 1004). In some embodiments, the processing unit 1006 includes a receiving unit 1010, a determining unit 1012, and a providing unit 1014.

The processing unit 1014 is configured to: at an electronic device including a touch sensitive display: display, on the touch sensitive display (e.g., using touch-sensitive display unit 1018), a graphical user interface (GUI); receive (e.g., using receiving unit 1010) an input representing a contact with the GUI, the input having an input intensity; and in response to receiving the input and in accordance with a determination that the electronic device is in a first activity state, determine (e.g., using determining unit 1012) whether the input intensity of the input meets or exceeds a first characteristic intensity threshold; in accordance with a determination that the input intensity of the input meets or exceeds the first characteristic intensity threshold, provide (e.g., using providing unit 1014) a haptic feedback of a first feedback level; in response to receiving the input and in accordance with a determination that the electronic device is in a second activity state, determine (e.g., using determining unit 1012) whether the input intensity of the input meets or exceeds a second characteristic intensity threshold higher than the first characteristic intensity threshold; in accordance with a determination that the input intensity of the input meets or exceeds the second characteristic intensity threshold, provide (e.g., using providing unit 1014) a haptic feedback of a second feedback level higher than the first feedback level.

In accordance with some embodiments, the GUI includes an affordance, and wherein the input represents a contact with the affordance, the processing unit 1014 is further configured to: in accordance with a determination that the input intensity of the input does not meet or exceed the first characteristic intensity threshold, provide (e.g., using providing unit 1014) a haptic feedback of a third feedback level different from the first feedback level; and in accordance with a determination that the input intensity of the input does not meet or exceed the second characteristic intensity threshold, provide (e.g., using providing unit 1014) a haptic feedback of a fourth feedback level different from the second feedback level and higher than the third feedback level.

In accordance with some embodiments, the determination that the electronic device is in the second activity state is based at least in part on one or more data selected from the group consisting of: accelerometer data, global positioning system data, wireless communication data, heart rate sensor data, and gyroscope data.

The operations described above with reference to FIG. 10 are, optionally, implemented by components depicted in FIGS. 1A-1B or FIG. 10. For example, displaying operation 802 (FIG. 8A), receiving operation 804 (FIG. 8A), determining operation 806 (FIG. 8A), and providing operation 808 (FIG. 8A0 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium comprising one or more programs for execution by one or more processors of an electronic device, the one or more programs including instructions which, when executed by the one or more processors, cause the electronic device to:
  display a graphical user interface (GUI), wherein the GUI includes a first affordance associated with a first application process;
  receive an input representing a contact with the first affordance, the input having an input intensity;
  in response to receiving the input and in accordance with a determination that the electronic device is in a first activity state:

determine whether the input intensity of the input meets or exceeds a first characteristic intensity threshold; and in accordance with a determination that the input intensity of the input meets or exceeds the first characteristic intensity threshold while the electronic device is in the first activity state, perform the first application process; and in response to receiving the input and in accordance with a determination that the electronic device is in a second activity state different than the first activity state:

determine whether the input intensity of the input meets or exceeds a second characteristic intensity threshold higher than the first characteristic intensity threshold; and in accordance with a determination that the input intensity of the input meets or exceeds the second characteristic intensity threshold while the electronic device is in the second activity state, perform the first application process.

2. The non-transitory computer-readable storage medium of claim 1, the one or more programs further including instructions which, when executed by the one or more processors, cause the electronic device to:

in accordance with the determination that the electronic device is in the first activity state and a determination that the input intensity of the input does not meet or exceed the first characteristic intensity threshold, perform a second application process and forgo performance of the first application process; and in accordance with the determination that the electronic device is in the second activity state and a determination that the input intensity of the input does not meet or exceed the second characteristic intensity threshold, perform the second application process and forgo performance of the first application process.

3. The non-transitory computer-readable storage medium of claim 2, the one or more programs further including instructions which, when executed by the one or more processors, cause the electronic device to:

in response to receiving a second input and in accordance with a determination that the second input represents a contact on a portion of the GUI that does not include the first affordance and the determination that the electronic device is in the second activity state, determine whether a second input intensity of the second input meets or exceeds a third characteristic intensity threshold greater than or equal to the first characteristic intensity threshold and lower than the second characteristic intensity threshold.

4. The non-transitory computer-readable storage medium of claim 3, the one or more programs further including instructions which, when executed by the one or more processors, cause the electronic device to:

in accordance with a determination that the second input intensity of the second input does not meet or exceed the third characteristic intensity threshold, forgo action.

5. The non-transitory computer-readable storage medium of claim 1, wherein the determination that the electronic device is in the first activity state and the determination that the electronic device is in the second activity state are each independently based at least in part on one or more data selected from the group consisting of: accelerometer data, global positioning system data, wireless communication data, heart rate sensor data, and gyroscope data.

6. The non-transitory computer-readable storage medium of claim 1, wherein the determination that the electronic device is in the first activity state includes a determination that a user of the electronic device is stationary or walking.

7. The non-transitory computer-readable storage medium of claim 1, wherein the determination that the electronic device is in the second activity state includes a determination that a user of the electronic device is walking or running.

8. The non-transitory computer-readable storage medium of claim 1, the one or more programs further including instructions which, when executed by the one or more processors, cause the electronic device to:

in accordance with the determination that the electronic device is in the first activity state and the determination that the input intensity of the input meets or exceeds the first characteristic intensity threshold, provide haptic feedback of a first feedback level; and in accordance with the determination that the electronic device is in the second activity state and the determination that the input intensity of the input meets or exceeds the second characteristic intensity threshold, provide haptic feedback of a second feedback level greater than the first feedback level.

9. The non-transitory computer-readable storage medium of claim 1, the one or more programs further including instructions which, when executed by the one or more processors, cause the electronic device to:

further in response to receiving the input and in accordance with the determination that the electronic device is in the second activity state:

in accordance with a determination that the input intensity of the input does not meet or exceed the second characteristic intensity threshold, forgo performing the first application process.

10. An electronic device comprising:

one or more processors;

a memory;

a touch-sensitive display coupled to the one or more processors and the memory; and one or more programs stored in the memory, the one or more programs including instructions for:

displaying, on the touch-sensitive display, a graphical user interface (GUI), wherein the GUI includes a first affordance associated with a first application process;

receiving an input representing a contact with the first affordance, the input having an input intensity;

in response to receiving the input and in accordance with a determination that the electronic device is in a first activity state:

determining whether the input intensity of the input meets or exceeds a first characteristic intensity threshold; and in accordance with a determination that the input intensity of the input meets or exceeds the first characteristic intensity threshold while the electronic device is in the first activity state, performing the first application process; and in response to receiving the input and in accordance with a determination that the electronic device is in a second activity state different than the first activity state:

determining whether the input intensity of the input meets or exceeds a second characteristic intensity threshold higher than the first characteristic intensity threshold; and in accordance with a determination that the input intensity of the input meets or exceeds the second characteristic intensity threshold while the electronic device is in the second activity state, performing the first application process.

11. The electronic device of claim 10, wherein the one or more programs further including instructions for:
in accordance with the determination that the electronic device is in the first activity state and a determination that the input intensity of the input does not meet or exceed the first characteristic intensity threshold, performing a second application process and forgoing performance of the first application process; and
in accordance with the determination that the electronic device is in the second activity state and a determination that the input intensity of the input does not meet or exceed the second characteristic intensity threshold, performing the second application process and forgoing performance of the first application process.

12. The electronic device of claim 11, the one or more programs further including instructions for:
in response to receiving a second input and in accordance with a determination that the second input represents a contact on a portion of the GUI that does not include the first affordance and the determination that the electronic device is in the second activity state, determining whether a second input intensity of the second input meets or exceeds a third characteristic intensity threshold greater than or equal to the first characteristic intensity threshold and lower than the second characteristic intensity threshold.

13. The electronic device of claim 12, the one or more programs further including instructions for:
in accordance with a determination that the second input intensity of the second input does not meet or exceed the third characteristic intensity threshold, forgoing action.

14. The electronic device of claim 10, wherein the determination that the electronic device is in the first activity state and the determination that the electronic device is in the second activity state are each independently based at least in part on one or more data selected from the group consisting of: accelerometer data, global positioning system data, wireless communication data, heart rate sensor data, and gyroscope data.

15. The electronic device of claim 10, wherein the determination that the electronic device is in the first activity state includes a determination that a user of the electronic device is stationary or walking.

16. The electronic device of claim 10, wherein the determination that the electronic device is in the second activity state includes a determination that a user of the electronic device is walking or running.

17. The electronic device of claim 10, the one or more programs further including instructions for:
in accordance with the determination that the electronic device is in the first activity state and the determination that the input intensity of the input meets or exceeds the first characteristic intensity threshold, providing haptic feedback of a first feedback level; and
in accordance with the determination that the electronic device is in the second activity state and the determination that the input intensity of the input meets or exceeds the second characteristic intensity threshold, providing haptic feedback of a second feedback level greater than the first feedback level.

18. The electronic device of claim 10, the one or more programs further including instructions for:
further in response to receiving the input and in accordance with the determination that the electronic device is in the second activity state:
in accordance with a determination that the input intensity of the input does not meet or exceed the second characteristic intensity threshold, forgoing performing the first application process.

19. A method comprising:
at an electronic device including a touch-sensitive display:
displaying, on the touch-sensitive display, a graphical user interface (GUI), wherein the GUI includes a first affordance associated with a first application process;
receiving an input representing a contact with the first affordance, the input having an input intensity;
in response to receiving the input and in accordance with a determination that the electronic device is in a first activity state:
determining whether the input intensity of the input meets or exceeds a first characteristic intensity threshold; and
in accordance with a determination that the input intensity of the input meets or exceeds the first characteristic intensity threshold while the electronic device is in the first activity state, performing the first application process; and
in response to receiving the input and in accordance with a determination that the electronic device is in a second activity state different than the first activity state:
determining whether the input intensity of the input meets or exceeds a second characteristic intensity threshold higher than the first characteristic intensity threshold; and
in accordance with a determination that the input intensity of the input meets or exceeds the second characteristic intensity threshold while the electronic device is in the second activity state, performing the first application process.

20. The method of claim 19, further comprising:
in accordance with the determination that the electronic device is in the first activity state and a determination that the input intensity of the input does not meet or exceed the first characteristic intensity threshold, performing a second application process and forgoing performance of the first application process; and
in accordance with the determination that the electronic device is in the second activity state and a determination that the input intensity of the input does not meet or exceed the second characteristic intensity threshold, performing the second application process and forgoing performance of the first application process.

21. The method of claim 20, further comprising:
in response to receiving a second input and in accordance with a determination that the second input represents a contact on a portion of the GUI that does not include the first affordance and the determination that the electronic device is in the second activity state, determining whether a second input intensity of the second input meets or exceeds a third characteristic intensity threshold greater than or equal to the first characteristic intensity threshold and lower than the second characteristic intensity threshold.

22. The method of claim 21, further comprising:
in accordance with a determination that the second input intensity of the second input does not meet or exceed the third characteristic intensity threshold, forgoing action.

23. The method of claim 19, wherein the determination that the electronic device is in the first activity state and the determination that the electronic device is in the second activity state are each independently based at least in part on one or more data selected from the group consisting of: accelerometer data, global positioning system data, wireless communication data, heart rate sensor data, and gyroscope data.

24. The method of claim 19, wherein the determination that the electronic device is in the first activity state includes a determination that a user of the electronic device is stationary or walking.

25. The method of claim 19, wherein the determination that the electronic device is in the second activity state includes a determination that a user of the electronic device is walking or running.

26. The method of claim 19, further comprising:
in accordance with the determination that the electronic device is in the first activity state and the determination that the input intensity of the input meets or exceeds the first characteristic intensity threshold, provide haptic feedback of a first feedback level; and
in accordance with the determination that the electronic device is in the second activity state and the determination that the input intensity of the input meets or exceeds the second characteristic intensity threshold, provide haptic feedback of a second feedback level greater than the first feedback level.

27. The method of claim 19, further comprising:
further in response to receiving the input and in accordance with the determination that the electronic device is in the second activity state:
in accordance with a determination that the input intensity of the input does not meet or exceed the second characteristic intensity threshold, forgoing performing the first application process.

* * * * *